US010055720B2

(12) United States Patent
MacGregor et al.

(10) Patent No.: US 10,055,720 B2
(45) Date of Patent: Aug. 21, 2018

(54) VIRTUAL CURRENCY SYSTEM

(71) Applicant: nChain Holdings Limited, St. John's (AG)

(72) Inventors: Robert Scott MacGregor, Vancouver (CA); Milagrino Jose C. Ong, Vancouver (CA)

(73) Assignee: NCHAIN HOLDING LIMITED, St. John's (AG)

( * ) Notice: Subject to any disclaimer, the term of this patent is extended or adjusted under 35 U.S.C. 154(b) by 0 days.

(21) Appl. No.: 15/783,761

(22) Filed: Oct. 13, 2017

(65) Prior Publication Data
US 2018/0039960 A1    Feb. 8, 2018

Related U.S. Application Data

(63) Continuation of application No. 14/218,763, filed on Mar. 18, 2014, now Pat. No. 9,830,580.

(51) Int. Cl.
*G06Q 20/00* (2012.01)
*G06Q 20/10* (2012.01)
(Continued)

(52) U.S. Cl.
CPC ............ *G06Q 20/10* (2013.01); *G06Q 20/06* (2013.01); *G06Q 20/065* (2013.01);
(Continued)

(58) Field of Classification Search
CPC ...................................................... G06Q 20/06
(Continued)

(56) References Cited

U.S. PATENT DOCUMENTS 6,023,508 A    2/2000  Bombard et al.
6,487,542 B2  11/2002  Ebata et al.
(Continued)

FOREIGN PATENT DOCUMENTS

WO    2012122994    9/2012
WO    2012167202   12/2012
WO    2015143068    9/2015

OTHER PUBLICATIONS

Androutsellis-Theotokis, Stephanos and Diomidis Spin Ellis, A Survey of Peer-to-Peer Content Distribution Technologies, ACM Computing Surveys, vol. 36, No. 4, Dec. 2004, pp. 335-371.
(Continued)

*Primary Examiner* — Ojo O Oyebisi
(74) *Attorney, Agent, or Firm* — Davis Wright Tremaine LLP; Heather M. Colburn

(57) ABSTRACT

A system including a network connected to at least one mint computing device implementing a virtual currency mint. The network has a ring topology and includes computing devices that implement a plurality of nodes. The mint issues units of virtual currency to user accounts implemented by the nodes. Each of at least a portion of the nodes is configured to initiate (as a sender node) a transaction with a recipient node that transfers at least one unit of the virtual currency from a sender one of the user accounts to a recipient one of the user accounts. The recipient node validates the transaction, creates a receipt, performs an operation on the receipt to identify a storage node, and routes the receipt to the storage node. The storage node stores the receipt, identifies next storage nodes, and routes copies of the receipt to the next storage nodes for storage thereby.

14 Claims, 8 Drawing Sheets

(51) Int. Cl.
*H04L 9/32* (2006.01)
*G06Q 20/06* (2012.01)
*G06Q 20/22* (2012.01)
*G06Q 20/36* (2012.01)
*G06Q 30/02* (2012.01)
*G06Q 40/00* (2012.01)

(52) U.S. Cl.
CPC ....... *G06Q 20/223* (2013.01); *G06Q 20/3678* (2013.01); *G06Q 30/02* (2013.01); *H04L 9/321* (2013.01); *H04L 9/3247* (2013.01); *H04L 2209/56* (2013.01)

(58) Field of Classification Search
USPC .......................................... 705/35, 44, 64, 69
See application file for complete search history.

(56) References Cited

U.S. PATENT DOCUMENTS

| | | | |
|---|---|---|---|
| 7,590,602 | B1 | 9/2009 | Luzzato |
| 2002/0161721 | A1 | 10/2002 | Yuan et al. |
| 2003/0099237 | A1 | 5/2003 | Mitra et al. |
| 2004/0196293 | A1 | 10/2004 | Fernandez et al. |
| 2005/0083936 | A1 | 4/2005 | Ma |
| 2005/0165858 | A1 | 7/2005 | Tom et al. |
| 2007/0136180 | A1 | 6/2007 | Salomon et al. |
| 2007/0198432 | A1* | 8/2007 | Pitroda .................. G06Q 20/02 705/64 |
| 2008/0080522 | A1 | 4/2008 | Denecheau et al. |
| 2008/0181200 | A1 | 7/2008 | Leygues |
| 2008/0313450 | A1 | 12/2008 | Rosenberg |
| 2009/0041252 | A1 | 2/2009 | Hanna |
| 2012/0005077 | A1 | 1/2012 | Pitroda et al. |
| 2012/0233073 | A1 | 9/2012 | Salmon et al. |
| 2012/0253852 | A1 | 10/2012 | Pourfallah et al. |
| 2013/0054471 | A1 | 2/2013 | Samid |
| 2013/0254052 | A1 | 9/2013 | Royyuru et al. |
| 2013/0346164 | A1 | 12/2013 | Ramamurti |
| 2014/0040127 | A1 | 2/2014 | Chatterjee et al. |
| 2014/0122456 | A1 | 5/2014 | Dies |
| 2014/0129428 | A1 | 5/2014 | Tyler et al. |
| 2014/0330721 | A1* | 11/2014 | Wang .................... G06Q 20/40 705/44 |
| 2015/0262173 | A1 | 9/2015 | Durbin et al. |
| 2015/0269539 | A1 | 9/2015 | MacGregor et al. |
| 2015/0271183 | A1 | 9/2015 | MacGregor et al. |

OTHER PUBLICATIONS

Hasan, Omar et al., "Preserving privacy of feedback providers in decentralized reputation systems," Computers & Security 31 (2012) 816-826.

"Liebau, Trusted Accounting in Peer-to-Peer Environments—A Novel Token-based Accounting Scheme forAutonomous Distributed Systems, Sep. 2008, retrieved from the Internet: http://tuprints.ulb.tu-darmstadt.de/1193/Dissertation_liebau_2008-Main.pdf".

Petri, Ioan et al., "Service level agreement as a complementary currency in peer-to-peer markets," Future Generation Computer Systems 28 (2012) 1316-1327.

Wikipedia, "Ring Network," dated Feb. 26, 2014 [Retrieved on Aug. 28, 2017] Retrieved from the Internet: URL: https://en.wikipedia.org/w/index.php?title=Ring_network &oldid=597221706.

Final Office Action, dated Mar. 1, 2017, received in U.S. Appl. No. 14/218,776.

Extended European Search Report, dated Sep. 7, 2017, received in European Application No. 15 764 765.

First Office Action, dated Jul. 24, 2017, received in Canadian Application No. 2,943,230.

International Patent Application No. PCT/US2015/021310, International Search Report and Written Opinion dated Jul. 30, 2015.

Non-Final Office Action, dated Aug. 14, 2017, received in U.S. Appl. No. 14/218,776.

Non-Final Office Action, dated Dec. 22, 2016, received in U.S. Appl. No. 14/218,776.

U.S. Appl. No. 14/218,781, Non-Final Office Action dated Aug. 18, 2015.

Information Disclosure Statement Transmittal filed herewith.

Final Office Action, dated Jan. 12, 2018, received in U.S. Appl. No. 14/218,776.

* cited by examiner

VIRTUAL CURRENCY SYSTEM

CROSS-REFERENCE TO RELATED APPLICATIONS

The present application is a continuation of U.S. patent application Ser. No. 14/218,763, filed on Mar. 18, 2014, which is hereby incorporated by reference in its entirety.

BACKGROUND OF THE INVENTION

Field of the Invention

Example embodiments of the present invention are directed generally to systems and methods that implement virtual currencies.

Description of the Related Art

The following description includes information that may be useful in understanding the present invention. It is not an admission that any of the information provided herein is prior art or relevant to the presently claimed invention, or that any publication specifically or implicitly referenced is prior art.

Traditional face-to-face cash transactions may be characterized as having four attributes (1) direct transmission, (2) irreversibility, (3) price stability, and (4) functionally (or effectively) unlimited liquidity. The first attribute, direct transmission, means a transaction can be conducted without the need to interact with a bank or some other form of a central clearing authority. The second attribute, irreversibility, refers to the inability of a sender to recall a transferred instrument (e.g., cash) from a recipient after the transaction has been authorized by the sender and confirmed as having been received by the recipient.

In contrast, reversibility refers to the ability to reverse or cancel a payment as a function of the payment system, not the legal right to return defective goods or to demand refund for services or goods not provided because of the transaction itself. Consumer protections with respect to the provision of contracted wares or services are an entirely separate issue. Instead, what is referred to in this context is the ability to reverse a payment itself by virtue of the system used to provide the payment. For example, a first consumer who purchases a book with cash, and a second customer who purchases a book from the same merchant via the merchant's online bookstore using a credit card have the same contractual entitlements with respect to the provision of goods, ability to return the books, etc. However, the introduction of the financial intermediaries during the credit card transaction, in effect, provides the second customer with an additional avenue of recourse, namely transaction reversal, or "chargeback," provided by the payment method. Unfortunately, such reversals may occur several months after the date of the transaction.

The third attribute, price stability, refers to the stability of the value of the instrument, particularly in relation to an operating currency or currencies of the recipient. The fourth attribute, functionally (or effectively) unlimited liquidity, means the instrument is marketable or sufficiently tradable (purchasable or sellable).

With the emergence of the Internet and, subsequently, the World Wide Web, merchants immediately recognized and sought to capitalize on the seemingly limitless commercial potential of virtual, remote access to global markets. As a result, such merchants and existing financial institutions sought to find ways to employ, or adapt the available financial infrastructure, to enable remote transactions over this new communication medium. Thus, ecommerce was born.

All ecommerce transactions may be characterized as being remote transactions. Thus, ecommerce cannot be conducted using traditional face-to-face cash transactions. Therefore, existing systems were adapted for use within the new, remote virtualized ecommerce environment. It is worth bearing in mind that systems in existence before the introduction of ecommerce were not designed to facilitate efficient remote transactions of this kind and on this scale. Instead, these pre-existing systems were adopted for and adapted to this use.

If ecommerce transactions are conducted in an official currency of a stable government (e.g., U.S. dollars), the transactions will have the third and fourth attributes, price stability, and functionally (or effectively) unlimited liquidity, respectively. Nevertheless, such ecommerce transactions will lack the first and second attributes, direct transmission, and irreversibility, respectively, of traditional face-to-face cash transactions because ecommerce on the Internet typically relies almost exclusively on financial intercessors (banks and financial institutions, card associations, etc.) that function as third party intermediaries (or centralized authorities) to process and clear electronic payments. Conventional ecommerce systems are predicated on trust-based systems that require these centralized authorities to validate and clear submitted transactions. Thus, conventional ecommerce transactions lack the first attribute, direct transmission.

While the existing systems function passably for many classes of transactions, from a merchant processing perspective, they suffer from fundamental constraints (and costs) inherent in the centralized, trust-based model. For example, within such systems, irreversible transactions are not possible, because the third-party financial intermediaries must mediate transactional disputes. Thus, conventional ecommerce transactions lack the second attribute, irreversibility, of traditional face-to-face cash transactions.

The interposition of these intermediaries has the effect of shifting both the practical onus of validating transactions and transaction costs that fund the intermediaries to the merchants. Such transactions costs may include per-transaction processing fees charged by intermediaries. Unfortunately, these costs erode profit margins and/or are passed on as incremental fees to potential customers. Further, intermediaries may impose systemic penalties and/or constraints. For example, third party intermediaries and associated clearance infrastructure (e.g., acquiring banks, card associations, etc.) may impose restrictions as to the nature, size, and source of transactions between a customer and the merchant. While some intermediated systems are efficient (e.g., credit cards), others can take hours or days to clear (e.g., electronic funds transfers ("EFT"), debit ("DBT") card transactions, money wires, and the like).

Transaction reversal exposes merchants to immense incremental costs and risks, which may include direct costs associated with irretrievably lost goods, associated shipment fees in the event of fraudulent reversals, costs associated with licensing, developing, and/or maintaining systems that detect and mitigate fraud, wages of personnel required to manage internal controls and investigate, mediate or prosecute fraud, and bank and/or processor charges and reversal fees. To exacerbate matters for merchants that accept credit card payments, the acquiring facility itself may be jeopardized if chargebacks exceed specified thresholds.

There are additional problems inherent with the use of intermediaries to facilitate ecommerce transactions. For example, financial intermediaries act as de facto "gatekeepers" to ecommerce because without the 'permission' of such intermediaries (e.g., a bank or other processing infrastructure), conventional ecommerce cannot be conducted. Merchants are dis-incented or precluded from offering certain categories of products or from offering irreversible services due to potential payment reversal risks. Merchants must adopt aggressive know-your-customer ("KYC") policies and a "defensive" stance with respect to their customers to provide recourse in the event of fraud, further impairing the customer experience and impeding sales conversions. As is appreciated by those of ordinary skill in the art, KYC or "know your client" protocols are due diligence practices adopted to ascertain certain information from a particular client used to establish identity and bona fides prior to doing business with that particular client. More generally, "KYC" refers to the general practice of gathering information about a potential customer to ensure the potential customer's identity (e.g., to satisfy a compliance obligation, and/or mitigate against potential future fraud). Because banks have a significant KYC regulatory burden, interposing a bank (as a financial intermediary) imposes the bank's KYC requirements on those merchants that wish to process payments through the bank.

Thus, a structural consequence of using a financial intermediary operating in a trust-based system is that merchants are compelled to absorb and accommodate unavoidable expenses, risks, and operational constraints. Even in the face of such costs and constraints, however, the opportunity that the Internet and ecommerce present to merchants is simply too enormous to ignore. Therefore, merchants have traditionally simply accepted such realities as systemically unavoidable, and resigned themselves to such losses and expenses as unavoidable "costs of doing business" online.

To address some of the problems associated with traditional ecommerce systems, alternative payment technologies and networks have been developed, such as FACEBOOK® Credits, AMAZON® Coins, traditional "e-wallets," "e-purses," GOOGLE® Wallet, and pre-paid debit cards. Such alternatives may be referred to as "e-money" or "virtual currency" or "e-cash." Nonetheless, like ecommerce transactions conducted using an intermediary, each of these alternative payment technologies and networks lacks one or more of the four attributes of traditional face-to-face cash transactions.

Therefore, a need exists for methods and systems that implement a virtual currency and transactions in the digital or on-line world using that virtual currency that have the four attributes of face-to-face cash transactions. The present application provides these and other advantages as will be apparent from the following detailed description and accompanying figures.

SUMMARY OF THE INVENTION

Embodiments include a system that includes a network and at least one mint computing device connected to the network. The network includes a plurality of computing devices and may have a ring topology. The plurality of computing devices implement a plurality of nodes. At least a portion of the plurality of nodes implement user accounts that each store units of a virtual currency. The plurality of nodes are incapable of creating units of the virtual currency. The at least one mint computing device implements a virtual currency mint configured to create and issue units of the virtual currency to the user accounts implemented by the plurality of nodes. The user accounts are configured to receive and store units of the virtual currency issued by the virtual currency mint. The virtual currency mint may create and issue units of the virtual currency to the user accounts in exchange for units of a real world currency. Optionally, the virtual currency mint may be configured to receive units of the virtual currency from the user accounts, and exchange those received units for units of a real world currency.

Each of at least a portion of the nodes is configured to initiate a transaction as a sender node with a different recipient one of the plurality of nodes. The transaction transfers at least one unit of the virtual currency from a sender one of the user accounts to a recipient one of the user accounts. The recipient node is configured to validate the transaction, create a new transaction receipt after validating the transaction, perform an operation on the new transaction receipt to identify a different storage one of the plurality of nodes, and route the new transaction receipt to the storage node. The recipient node validates the transaction without involving a validation authority. The recipient node may obtain validation information from only a subset of the plurality of nodes, and validate the transaction based on the validation information. Such validation information may include copies of a plurality of transaction receipts associated with the sender account. The storage node is configured to store the new transaction receipt, identify next storage ones of the plurality of nodes, and route copies of the new transaction receipt to the next storage nodes for storage thereby. Each of the next storage nodes may be implemented by a different one of the plurality of computing devices directly connected to the third computing device in the network.

The sender node may be implemented by a first of the plurality of computing devices, the recipient node may be implemented by a second of the plurality of computing devices, and the storage node may be implemented by a third of the plurality of computing devices. The first, second, and third computing devices may be different from one another.

The sender node may be configured to obtain a copy of the new transaction receipt, and store the copy in a local storage accessible to the sender node. In such embodiments, the local storage may store a plurality of transaction receipts associated with the sender account. In such embodiments, initiating the transaction may include obtaining copies of the transaction receipts associated with the sender account and stored in the local storage, creating a transaction request that includes the copies of the transaction receipts, and sending the transaction request to the recipient node. Optionally, the transaction receipts associated with the sender account and stored in the local storage implement a doubly linked list. The copies of the transaction receipts in the transaction request may be first copies of the transaction receipts. In such embodiments, the recipient node may be configured to send requests to at least a portion of the plurality of nodes for copies of any transaction receipts associated with the sender account, receive (as second copies of the transaction receipts) transaction receipts associated with the sender account from each of only a subset of the plurality of nodes, and validate the transaction based on the first and second copies of the transaction receipts.

In some embodiments of the system, each of the plurality of computing devices stores a local copy of a distributed hash table. In such embodiments, the sender node may be implemented by a sender one of the plurality of computing devices; and the recipient account may be associated with an account identifier. The sender node may be configured to lookup the account identifier in the local copy of the distributed hash table stored on the sender computing device to obtain a recipient address. In such embodiments, initiating the transaction includes sending a transaction request to the recipient address.

In embodiments of the system in which each of the plurality of computing devices stores a local copy of a distributed hash table, the recipient node may be implemented by a recipient one of the plurality of computing devices, and the operation performed on the new transaction receipt by the recipient node may include performing a hash function on at least a portion of the new transaction receipt to obtain a hash value. The recipient computing device may look up the hash value in the distributed hash table stored on the recipient computing device to obtain an address associated with the storage node. In such embodiments, routing the new transaction receipt to the storage node includes routing the new transaction receipt to the address associated with the storage node.

Embodiments include a first computer-implemented method. The first method includes implementing a sender node at a sender one of a plurality of computing devices within a network having a ring topology. The sender node includes a sender account. Each of the plurality of computing devices within the network may be incapable of creating one or more units of a virtual currency. The first method further includes implementing, by at least one mint computing device connected to the network, a virtual currency mint. The virtual currency mint creates units of the virtual currency, and issues at least one of the units of the virtual currency to the sender account.

The first method further includes identifying, at the sender node, a recipient one of the plurality of computing devices within the network. The recipient computing device implements a recipient node that includes a recipient account. The sender node initiates a transaction with the recipient node. The transaction transfers at least one unit of the virtual currency issued to the sender account from the sender account to the recipient account. The recipient node validates the transaction, creates a new transaction receipt after the transaction has been validated, performs an operation on the new transaction receipt to obtain a value, and identifies a storage one of the plurality of computing devices within the network using the value. The storage computing device implements a storage node. The first method further includes routing, by the recipient node, the new transaction receipt to the storage node. The storage node stores the new transaction receipt, and identifies next storage ones of the plurality of computing devices within the network. The next computing devices implement next storage nodes. The storage node routes copies of the new transaction receipt to the next storage nodes for storage thereby. The next storage computing devices may be directly connected to the storage computing device in the network.

In some embodiments of the first method, after the new transaction receipt has been routed to the storage node, the transaction is irreversible. Optionally, the sender, recipient, storage computing devices may be different from one another.

In some embodiments of the first method, each of the plurality of computing devices may store a local copy of a distributed hash table. In such embodiments, the recipient account is associated with an account identifier, and identifying the recipient computing device includes looking up the account identifier in the local copy of the distributed hash table stored on the sender computing device to obtain an address of the recipient computing device. The value may be a hash value, and the operation performed on the new transaction receipt at the recipient node may include performing a hash function on at least a portion of the new transaction receipt to obtain the hash value. In such embodiments, identifying the storage computing device using the value includes looking up the hash value in the distributed hash table stored on the recipient computing device to obtain an address associated with the storage computing device; and routing the new transaction receipt to the storage node includes routing the new transaction receipt to the address associated with the storage computing device.

In some embodiments of the first method, the sender node includes a local storage storing a plurality of transaction receipts associated with the sender account. In such embodiments, initiating the transaction at the sender node may include obtaining copies of the transaction receipts associated with the sender account and stored in the local storage, creating a transaction request that includes the copies of the transaction receipts, and sending the transaction request to the recipient computing device. The copies of the transaction receipts in the transaction request may be first copies of the transaction receipts. In such embodiments, validating the transaction at the recipient node may include sending requests to at least a portion of the plurality of computing devices in the network for copies of any transaction receipts associated with the sender account, receiving (as second copies of the transaction receipts) transaction receipts associated with the sender account from each of only a subset of the plurality of computing devices in the network, and validating the transaction based on the first and second copies of the transaction receipts.

Embodiments include a second computer-implemented method. The second method is performed by a validation one of a plurality of computing devices in a network. The second method includes receiving, at the validation computing device, a transaction request that requests transfer of a transaction amount of virtual currency from a sender account to a recipient account. The sender account is associated with transaction receipts. The transaction request includes (a) references to first copies of the transaction receipts, or (b) the first copies of the transaction receipts. The validation computing device requests second copies of the transaction receipts associated with the sender account from at least two of the plurality of computing devices in the network, receives the second copies of the transaction receipts from fewer than all of the plurality of computing devices in the network, and determines whether the first copies have been tampered with by comparing the first copies and the second copies of the transaction receipts to one another. When it is determined that the first copies have not been tampered with, the validation computing device generates at least one new transaction receipt for the transaction request, and forwards the at least one new transaction receipt to fewer than all of the plurality of computing devices in the network for storage thereby. The at least one new transaction receipt indicates that the transaction amount of the virtual currency has been transferred from the sender account to the recipient account.

In some embodiments of the second method, after the at least one new transaction receipt has been forwarded, the transfer of the transaction amount of the virtual currency from the sender account to the recipient account is irreversible.

In some embodiments of the second method, each of at least a portion of the transaction receipts associated with the sender account may include a first reference to an earlier one of the transaction receipts associated with the sender account, and a second reference to a later one of the transaction receipts associated with the sender account.

When each new transaction receipt is generated, the second method may include identifying a previously generated one of the transaction receipts associated with the sender account, including a first reference to the previously generated transaction receipt in the new transaction receipt, and including a second reference to the new transaction receipt in the previously generated transaction receipt such that the transaction receipts associated with the sender account define a doubly linked list.

In some embodiments of the second method, the second copies may include a plurality of past transaction amounts. In such embodiments, the second method may include totaling the past transaction amounts to obtain a sender account balance, and the at least one new transaction receipt may include first and second new transaction receipts. The first new transaction receipt indicates the sender account balance has been transferred from the sender account to the recipient account. The second new transaction receipt indicates a difference between the sender account balance and the transaction amount has been transferred from the recipient account to the sender account.

In some embodiments of the second method, the first copies include a plurality of past transaction amounts, and a sum of the plurality of past transaction amounts is less than or equal to the transaction amount.

In the second method, forwarding the at least one new transaction receipt to fewer than all of the plurality of computing devices in the network for storage thereby may include, for each new transaction receipt, (a) performing, by the validation computing device, a hash function on at least a portion of the new transaction receipt to obtain a hash value, (b) identifying, by the validation computing device, a different one of the plurality of computing devices in the network as a storage computing device based on the hash value and a distributed hash table, and (c) forwarding, by the validation computing device, the new transaction receipt to the storage computing device. In such embodiments, the storage computing device routes the new transaction receipt to at least one other of the plurality of computing devices in the network for storage thereby according to a routing algorithm using the distributed hash table. The routing algorithm may be influenced by at least one of a current number of the plurality of computing devices in the network, reachability of a particular one of the plurality of computing devices, and the hash value. In some embodiments of the second method, the new transaction receipt is stored in fewer than all of the plurality of computing devices in the network, and none of the plurality of computing devices stores copies of all transaction receipts stored within the network.

In some embodiments of the second method, the transaction request may include a signature, and the validation computing device may verify the signature.

In some embodiments of the second method, the recipient account may be stored on the validation computing device. The recipient account may have an account address stored in a distributed hash table.

In some embodiments of the second method, the network is a peer-to-peer network that may optionally have a ring topology.

Embodiments include a third computer-implemented method. The third method is for use with a plurality of computing devices in a network implementing a plurality of nodes. The third method includes receiving, at a validation one of the plurality of nodes, a transaction request requesting a transfer of a transaction amount of virtual currency from a sender account to a recipient account. The sender account is associated with transaction receipts. The transaction request includes (a) references to first copies of the transaction receipts associated with the sender account, or (b) the first copies of the transaction receipts. The validation node requests second copies of the transaction receipts associated with the sender account from at least two of the plurality of nodes, and receives the second copies from fewer than all of the plurality of nodes. The validation node determines whether the first copies have been tampered with by comparing the first copies and the second copies of the transaction receipts to one another. When it is determined that the first copies have not been tampered with, the validation node generates at least one new transaction receipt for the transaction request, and forwards the at least one new transaction receipt to fewer than all of the plurality of nodes for storage thereby. The at least one new transaction receipt indicates that the transaction amount of the virtual currency has been transferred from the sender account to the recipient account.

In some embodiments of the third method, forwarding the at least one new transaction receipt to fewer than all of the plurality of nodes for storage thereby may include, for each new transaction receipt, (a) performing, by the validation node, a hash function on at least a portion of the new transaction receipt to obtain a hash value, (b) identifying, by the validation node, a network address of a different one of the plurality of nodes as a storage node based on the hash value and a distributed hash table, and (c) forwarding, by the validation node, the new transaction receipt to the network address of the storage node. The storage node may route the new transaction receipt to at least one other of the plurality of nodes for storage thereby according to a routing algorithm using the distributed hash table. The new transaction receipt may be stored by fewer than all of the plurality of nodes. Further, none of the plurality of computing devices may store copies of all transaction receipts stored within the network.

Embodiments include a fourth computer-implemented method. The fourth method is performed by a sender one of a plurality of computing devices in a network. The plurality of computing devices implement a plurality of nodes. Each of the plurality of nodes has access to a distributed hash table. The sender computing device implements a sender one of the plurality of nodes. The fourth method includes locating, by the sender node, copies of transaction receipts associated with a sender account implemented by the sender node. The copies include a plurality of past transaction amounts of a virtual currency. The sender node totals the plurality of past transaction amounts of the virtual currency to obtain a sender account balance. If the sender account balance is equal to or greater than a current transaction amount of the virtual currency, the sender node creates a transaction request that requests a transfer of the current transaction amount to a recipient account implemented by a recipient one of the plurality of nodes. The recipient account is associated with a key value. The transaction request includes (a) references to the copies of the transaction receipts associated with the sender account, or (b) the copies of the transaction receipts. The sender node identifies a network address associated with the recipient node by looking up the key value in the distributed hash table, and routes the transaction request to the network address of the recipient computing device for processing thereby. Optionally, the sender node creates a signature by encrypting at least a portion of the copies of the transaction receipts using a key associated with the sender account, and the transaction request includes the signature. Optionally, the sender node creates a plurality of signatures by encrypting at least a portion of each of the copies of the transaction receipts using the key associated with the sender account, and the transaction request includes the plurality of signatures.

Embodiments include a fifth computer-implemented method. The fifth method is for use with a plurality of computing devices implementing a plurality of nodes of a ring-shaped overlay network. The fifth method includes receiving, at a bootstrap one of the plurality of nodes, a connection request from a joining node implemented by a joining computing device. In response to the connection request, the bootstrap node sends a handshake identifier to the joining node, and receives a first value created using the handshake identifier from the joining node. The bootstrap node may have generated the handshake identifier. For example, the handshake identifier may be a randomly generated number, and the bootstrap node may generate the random number used as the handshake identifier. The bootstrap node compares the first value to a second value. When the first and second values are identical, the joining node is validated and thereby allowed to join the overlay network. On the other hand, when the first and second values are not identical, the joining node is rejected and thereby prevented from joining the overlay network.

The fifth method may also include generating, at the bootstrap node, the second value by loading, as a byte stream, one or more portions of a legitimate copy of selected software code, and performing a hash function on the handshake identifier and the byte stream to obtain a hash value. In such embodiments, the second value is the hash value. The one or more portions of the legitimate copy of the selected software code may include a plurality of class files within a component library.

In some embodiments of the fifth method, when the joining node has been validated, the bootstrap node may assign a position within the overlay network to the joining node.

In some embodiments of the fifth method, when the joining node has been validated, the bootstrap node may assign a node identifier within the overlay network to the joining node. The node identifier may be determined as a function of an external Internet Protocol ("IP") address and network path associated with the joining node. Each of the plurality of nodes may have access to a distributed hash table used to route information between the plurality of nodes within the overlay network. In such embodiments, the bootstrap node may add the node identifier to the distributed hash table as a key.

Embodiments include a sixth computer-implemented method. The sixth method is for use with a plurality of computing devices implementing a plurality of nodes of a ring-shaped overlay network. The sixth method includes requesting, from a joining node implemented by a joining computing device, a connection with a bootstrap one of the plurality of nodes. In response, the joining node receives a handshake identifier from the bootstrap node, loads one or more portions of selected software code as a byte stream, and determines a first value by performing an operation on the handshake identifier and the byte stream. The operation may include performing a hash function on the handshake identifier and the byte stream to obtain a hash value. In such embodiments, the first value is the hash value. The one or more portions of the selected software code may include a plurality of class files within a component library. The joining node transmits the first value to the bootstrap node. The bootstrap node compares the first value to a second value. If the first and second values are identical, the joining node receives an indication from the bootstrap node that a connection with the bootstrap node has been established. On the other hand, if the first and second values are not identical, the joining node receives an indication from the bootstrap node that the request for a connection has been rejected.

In some embodiments of the sixth method, the handshake identifier may be a randomly generated number.

In some embodiments of the sixth method, after the connection with the bootstrap node has been established, the joining node receives an assignment of a position within the overlay network from the bootstrap node.

In some embodiments of the sixth method, after the connection with the bootstrap node has been established, the joining node receives an assignment of a node identifier within the overlay network from the bootstrap node. The node identifier may have been determined as a function of an external Internet Protocol ("IP") address and network path associated with the joining node. Each of the plurality of nodes may have access to a distributed hash table used to route information between the plurality of nodes within the overlay network. In such embodiments, the node identifier is added as a key in the distributed hash table.

BRIEF DESCRIPTION OF THE SEVERAL VIEWS OF THE DRAWING(S)

Various embodiments in accordance with the present disclosure will be described with reference to the drawings, in which.

DETAILED DESCRIPTION OF THE INVENTION

In the following description, various embodiments will be described. For purposes of explanation, specific configurations and details are set forth in order to provide a thorough understanding of the embodiments. However, it will also be apparent to those of ordinary skill in the art that the embodiments may be practiced without the specific details. Furthermore, well-known features may be omitted or simplified in order not to obscure the embodiment being described.

Example embodiments include systems and methods that implement a virtual currency and transactions using the virtual currency that have the four attributes of face-to-face cash transactions, namely: (1) irreversibility, (2) direct transmission (the absence of a financial intermediary), (3) price stability, and (4) functionally (or effectively) unlimited liquidity.

A unit of the virtual currency implemented by the system 100 may be characterized as being a digital bearer instrument. As is appreciated by those of ordinary skill in the art, a bearer instrument is a document or representative item that indicates that the owner of the document has title to property. Bearer instruments differ from normal registered instruments in that no records are maintained as to who owns the underlying property, or of the transactions involving transfer of ownership. In general, the legal situs of the property is where the instrument is located and whoever physically has possession of the bearer instrument is presumed to be the owner of the property. U.S. dollars are examples of bearer instruments.

System Overview

Figure 1:
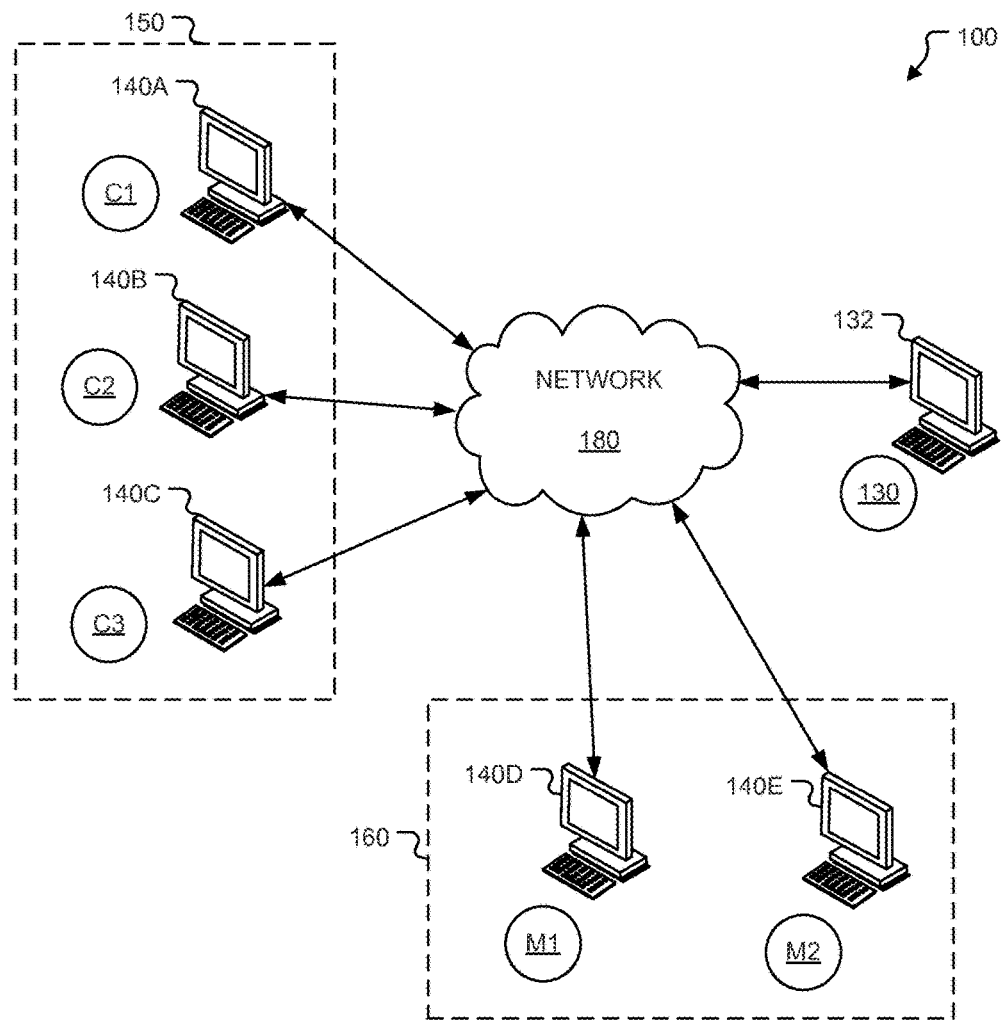
FIG. 1 is a diagram of an exemplary system configured to implement a virtual currency (or digital bearer instruments), and transactions using the virtual currency.

FIG. 1 is a diagram of a system 100 configured to implement a virtual currency (or digital bearer instruments). For ease of illustration, the system 100 will be described as implementing a single virtual currency. However, as is appreciated by those of ordinary skill in the art, the system 100 may be used to implement more than one virtual currency and such embodiments are within the scope of the present teachings.

The system 100 includes a plurality of computing devices 140A-140C operated by a plurality of customers 150, and a plurality of computing devices 140D and 140E operated by a plurality of merchants 160. The computing devices 140A-140E are connect to one another by a network 180. Together, the customers 150 and the merchants 160 are referred to as users. Each user may be associated with a User ID that is a unique ID that represents the user. While the users of the system 100 have been described as being customers and merchants, other types of users (e.g., charities, donors, etc.) wishing to store and/or transfer units of the virtual currency may also use the system 100.

The system 100 includes a computing system 132 operated by a centralized virtual currency issuing authority 130. The computing system 132 is connected by the network 180 (e.g., the Internet) to the computing devices 140A-140E. The computing system 132 may include one or more computing devices.

Each of the computing devices 140A-140E, as well as, the one or more computing devices implementing the computing system 132 may be implemented using a computing device 12 described below and illustrated in FIG. 9.

Figure 2:
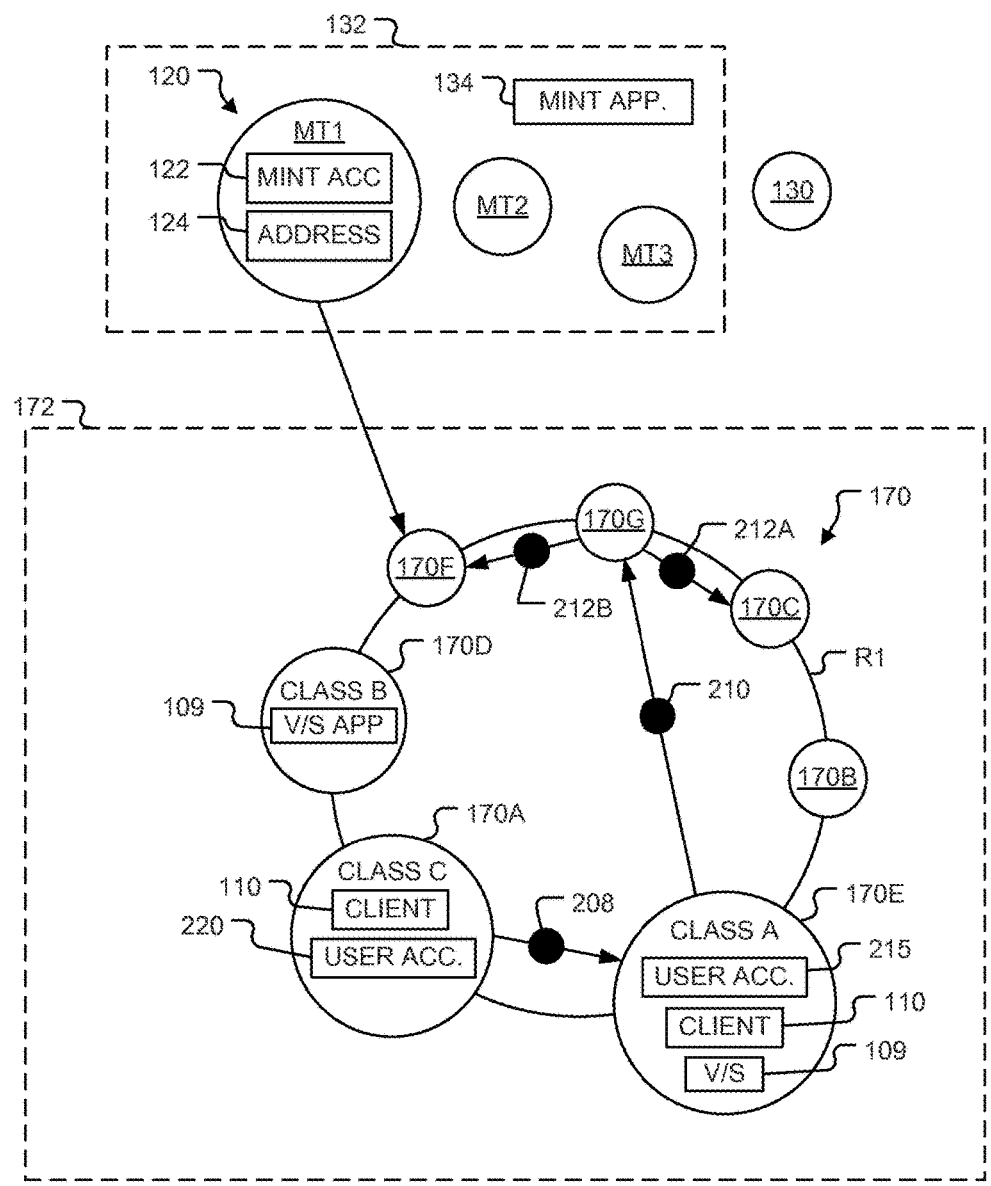
FIG. 2 is a diagram illustrating a network including a plurality of nodes implemented by the system of FIG. 1.

Referring to FIG. 2, the computing system 132 executes a mint application 134 that implements one or more mint nodes 120 controlled by the issuing authority 130. In the embodiment illustrated, the mint nodes 120 include three mint nodes MT1-MT3. However, the system 100 may include any number of mint nodes 120. Together, the mint nodes 120 may be characterized as being a mint. Each of the mint nodes 120 may be implemented by a different computing device (like the computing device 12 illustrated in FIG. 9) executing a copy of the mint application 134. However, this is not a requirement.

Each of the mint nodes 120 is associated with a mint account 122 that stores units of the virtual currency as an account balance. Further, as will be described in detail below, the mint application 134 is configured to create (or mint) units of the virtual currency via a genesis transaction, store those units in its mint account 122, and issue units of the virtual currency (from its mint account) to customers 150 and/or merchants 160. As will also be described in detail below, the mint application 134 may also be configured to exchange (or redeem) units of the virtual currency for units of a real world (or fiat) currency. The account balance of a particular mint account represents units of the virtual currency that have been redeemed (or sold back to the particular mint account) by the users, and/or units of the virtual currency that were minted through a genesis transaction but have not yet been issued to one or more of the users.

Each of the mint nodes 120 may have a special-purpose mint address 124 predefined by the computing system 132.

The computing devices 140A-140E (see FIG. 1) operated by the users implement a plurality of (non-mint) regular nodes 170 that together define a peer-to-peer ("P2P") network 172. Each of the regular nodes 170 operates autonomously and in a decentralized manner. Each of the regular nodes 170 may be implemented by a different one of the computing devices 140A-140E (see FIG. 1). However, this is not a requirement. For ease of illustration, in FIG. 2, the P2P network 172 is depicted as including seven nodes 170A-170G. However, the P2P network 172 may include any number of nodes. Also for ease of illustration, the nodes 170A-170E will be described as being implemented by the computing devices 140A-140E, respectively.

The network 172 may include (or be organized into) one or more overlay P2P networks (e.g., an overlay P2P network R1) each having a ring network topology in which each node is connected to two other nodes. Within the system 100, as will be described in more detail below, transactions between users are validated by one of the overlay P2P networks (e.g., the overlay P2P network R1). For ease of illustration, in FIG. 2, the overlay P2P network R1 is depicted as including seven nodes (the regular nodes 170A-170G). However, the overlay P2P network R1 may include any number of the regular nodes 170.

The system 100 provides a virtual currency infrastructure and platform that may be implemented as an open system enabling the use of the virtual currency by any user (e.g., customer, merchant, and the like) that elects to accept or use the system 100. Purchases of the virtual currency from the mint nodes 120 may be conducted using conventional ecommerce clearance methods in which a third party intermediary (e.g., a bank) clears the fiat currency provided by the user. In such embodiments, purchases from the mint nodes 120 may not be anonymous. However, once units of the virtual currency have been issued, transactions between the users within the P2P network 172 are conducted between cryptographic addresses (e.g., public keys) that have no necessary relationship to the users or to their identities. Therefore, all transactions between users may be anonymous.

As mentioned above, the system 100 may be a bidirectional system in which units of the virtual currency can be redeemed at the mint nodes 120 in exchange for fiat currencies. Redemption transactions whereby the units of the virtual currency are sold to the mint nodes 120 may be subject to KYC protocols and therefore, may not be anonymous.

The system 100 enables direct transmission of units of the virtual currency between the users. Such direct transactions are cleared by a decentralized clearance system operating within the distributed P2P network 172. Thus, the system 100 lacks a centralized clearance authority and does not use an intermediary to validate transactions between users. The issuing authority 130 has no role in approving or clearing transactions between users, and does not have the ability to "see" or trace individual transactions between users.

Within the P2P network 172, the regular nodes 170 may be implemented as "validation/storage" nodes, "client" nodes, or both. Class A nodes (e.g., the node 170E) are nodes within the network 172 that can function as both a "client" node as well as a "validation/storage" node. Class B nodes (e.g., the node 170D) function as "validation/storage" nodes only and do not function as "client" nodes. Class C nodes (e.g., the node 170A) function as "client-only" nodes and do not function as "validation/storage" nodes.

"Validation/storage" nodes (e.g., the nodes 170D and 170E) are each configured to validate transactions and store transaction receipts. "Validation/storage" nodes each include a validation/storage application 109 that implements the functionality of the "validation/storage" node. The validation/storage application 109 may be obtained (e.g., downloaded) from the computing system 132 operated by the issuing authority 130.

A "client" node is configured to contact and route transactions to peer nodes within the network 172. Transactions may be conducted by transferring units of the virtual currency (1) between different user accounts, (2) between different mint accounts, and (3) between a user account and a mint account. "Client" nodes include a client application 110 that implements the functionality of the "client" node. The client application 110 may be obtained (e.g., downloaded) from the computing system 132 operated by the issuing authority 130.

Figure 3:
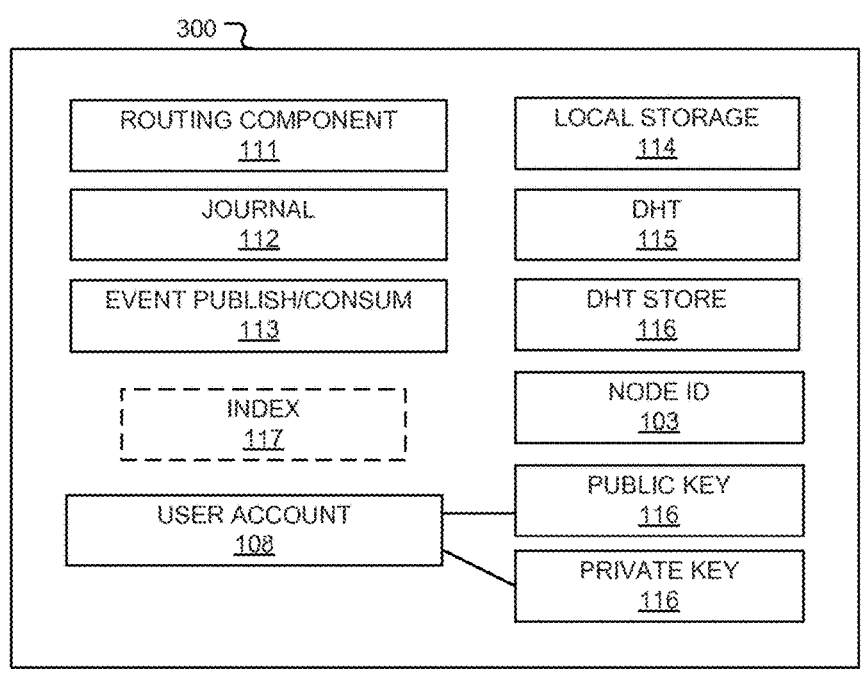
FIG. 3 is a block diagram illustrating software components implementing the nodes of the network of FIG. 2.

FIG. 3 depicts some of the software components and data 300 stored by each of the nodes 170. Referring to FIG. 3, each of the nodes 170 implements one or more user accounts (e.g., user account 108) that each stores an amount of the virtual currency (originally issued by one of the mint nodes 120). Each of the user accounts is owned by at least one of the users (e.g., one or more of the customers 150 and/or the merchants 160) of the system 100.

The user account 208 is functionally a 'virtual vault' into which a user may receive or store units of the virtual currency, or from which a user may initiate a transaction. Each user account is associated with a public key 116 and a private key 118 that together form a key pair. The public key 116 may be used as the address of the user account 208. The private key 118 may be used sign (or encrypt) a transaction message sending units of the virtual currency to a different user account. A user can generate and be associated with multiple user accounts and each user account may (and typically will) be associated with multiple transaction receipts. The balance of an account (either a user account or a mint account) is a total of all transaction receipts associated with the user account. As will be explained in detail below, whenever units of the virtual currency are added to or removed from an account, a transaction receipt is generated and copies of the receipt are stored within a portion of the regular nodes 170 of the network 172. For example, the transaction receipt may be stored by a portion of the nodes of the overlay P2P network R1.

Returning to FIG. 2, a Class C node (or a "client-only" node), such as the node 170A, does not form part of a distributed storage ring (e.g., the overlay P2P network R1). Because every user of the system 100 may not remain online, such users may not be reliable enough to participate in the storage distribution functions performed by the "validation/storage" nodes. A casual user, for example, will most likely log onto the system 100, conduct a transaction, and exit the system 100. Furthermore, users using mobile devices may not be able to participate as fully functional nodes in the network 172. Thus, such mobile devices and/or computing devices operated by casual (or otherwise insufficiently reliable) users may function as "client-only" nodes within the network 172.

Referring to FIG. 3, each of the nodes 170 includes a routing component 111, a journal 112, an event publishing/consuming component 113, and a local storage 114. Further, each of the nodes includes a local copy of a distributed hash table ("DHT") (illustrated as DHT 115). "Validation/storage" nodes each includes a DHT store 116.

The routing component 111 builds a hash value of a transaction receipt, and routes the transaction receipt to the appropriate peer within the network 172. The receiving peer verifies the transaction and initiates the storage process. The routing component 111 may implement an application programming interface or application of the FreePastry library.

The journal 112 represents a distributed hash table ("DHT") persistence component for use with the DHT 115. The journal 112 can be implemented as an extension of PAST. The journal 112 may use the default "insert" operations of PAST together with its built-in replication facilities. However, the journal 112 may overrides its "lookup" operation to enforce the retrieval of the replicated copies of a record, and its consistency-checking.

The publishing/consuming component 113 publishes successfully completed (and recorded) transaction receipts. The publishing/consuming component 113 may use the SCRIBE library to publish the transaction receipts. The publishing/consuming component 113 may use the public address of the recipient as a topic for the event. Each node, on startup, subscribes to topics corresponding to their public addresses. This component provides real-time notification of receipts so that live nodes can update their local storage 114 and provide client feedback.

The local storage 114 is used to store transaction receipts and spent inputs that concern the addresses (e.g., the public key 116) associated with the one or more user accounts (e.g., user account 108) implemented by the node. Example embodiments enable efficiencies (e.g., a persistent client cache) such that the node does not have to query the network 172 (see FIG. 2) for all transactions associated with a particular user account when the node wants to send or get the balance of the particular user account. The local storage 114 may be implemented using an embedded relational database using, for example, Apache Derby. However, alternative embodiments may be implemented using other storage mechanisms.

In addition to the components described above, each of the nodes 170 may also maintain an optional index 117 of transactions keyed on the public addresses of the user accounts. This allows for the efficient retrieval of all transaction receipts for a given address. It also addresses portability in that a user simply imports his/her addresses on a new machine or device and the records of relevant transactions will follow.

A unique identifier or "Node ID" 103 is assigned to each of the regular nodes 170. A Node ID is a persistent identifier that remains consistent whether the node is online or not, and is assigned by the network 172 or the system 100. A node ID may be generated for a node that is joining the network 172 for the first time by applying a hashing algorithm on the external internet protocol ("IP") address and network path of the node. This node ID 103 may serve as a key in the DHT 115.

The software components implementing the nodes 170 may be configured to run as part of a user interface (UI) client or in a command-line or headless mode.

User Transactions

A transaction between users may be characterized as having three components: (1) initiation, (2) validation, and (3) recordation.

1. Initiation

A sender is a user (or mint node) that initiates a transaction to send one or more units of the virtual currency from the sender's user account (or the mint node's mint account) to the recipient's user account. The recipient is the user (or mint node) that is to receive one or more units of the virtual currency from the sender through the transaction initiated by the sender.

Referring to FIG. 2, a sender (other than one of the mint nodes 120) initiates a transaction using the client application 110 executing on one of the computing devices 140A-140E (see FIG. 1). For ease of illustration, the sender will be described as being the customer C1 operating the computing device 140A, which is implementing the "client-only" (or Class C) node 170A. In this example transaction, the recipient is the merchant M2 operating the computing device 140E, which is implementing the Class A node 170E. The customer C1 is associated with a user (sender) account 220 implemented by the Class B node 170D, and the merchant M2 is associated with a user (recipient) account 215 implemented by the Class A node 170E.

The sender initiates the transaction by using the client application 110 to send a transaction message 208 from the user (sender) account 220 to the user (recipient) account 215. To send the transaction message 208, the sender must provide the public key 116 (address) of the user (recipient) account 215, the currency type, the transaction amount (expressed in units of the virtual currency), and references to (or copies of) transaction receipts associated with the user (sender) account 220.

Figure 4:
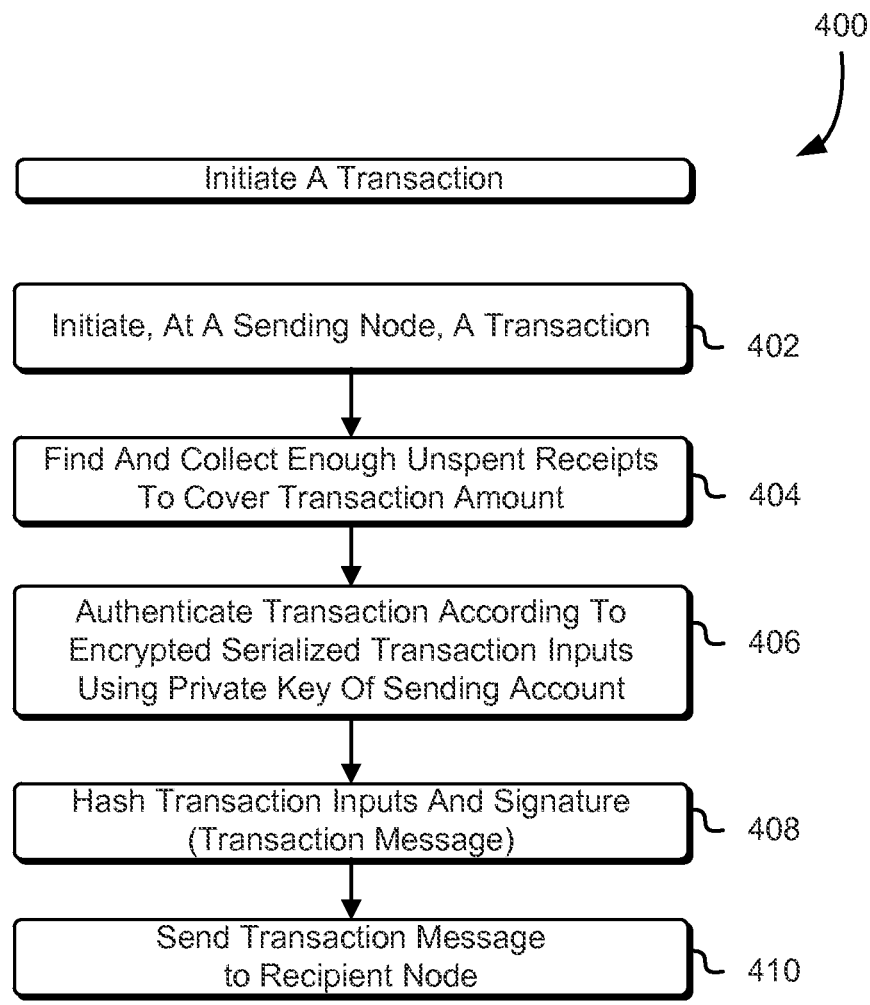
FIG. 4 is an illustrative example of a method of initiating a transaction on the network of FIG. 2.

FIG. 4 is a flow diagram of an embodiment of a method 400 of constructing the transaction message 208 that may be performed by the nodes 170A-170G. For ease of illustration, the method 400 will be described as being performed by the Class C node 170A. In first block 402, the sender (e.g., the customer C1) initiates a transaction at a sending node (e.g., the Class C node 170A). In block 404, the sending node (e.g., the Class C node 170A) automatically locates and collects the transaction receipts associated with the user (sender) account 220. For example, transaction receipts may be collected from the local storage 114 (see FIG. 3), and may query other nodes for copies of the transaction receipts stored in their DHT stores 116 (see FIG. 3). To ensure system integrity, it is necessary to ensure that a transaction is initiated by the user that has control over the user (sender) account 220. To achieve this, the transaction may be signed. In block 406, the sending node (e.g., the Class C node 170A) signs the transaction message by encrypting the serialized transaction inputs (e.g., the references to or copies of the transaction receipts) using the private key 118 associated with the user (sender) account 220. The ciphertext resulting from this encryption may be used as the signature. Optionally, the sender may sign each of the transaction receipts as well and include those signatures in the transaction message 208. In block 408, the transaction inputs together with the signature are packaged up into the transaction message 208. In block 410, the sending node (e.g., the Class C node 170A) sends the transaction message to the recipient node (e.g., the Class A node 170E). Then, the method 400 terminates.

2. Validation

The node (e.g., the Class A node 170E) associated with the user (recipient) account 215 receives the transaction message 208 and validates the transaction if certain conditions are satisfied. As mentioned above, the aggregation of all validated transaction receipts stored within the P2P network 170 represents a distributed record of the balances of each of the user accounts. In other words, a particular account balance is determined from all validated transaction receipts stored in the P2P network 170 that identify the account. The references to (or copies of) transaction receipts of the sender include transaction receipts evidencing transactions in which the sender either sent or received units of the virtual currency, and are used (during the validation process) to determine whether the user (sender) account 220 has a sufficient account balance to transfer the transaction amount. As mentioned above, the issuing authority 130 (see FIG. 1) is not involved in validating transactions between user accounts.

Validation includes querying the network for each transaction receipt referenced in the transaction message 208 and validating it. The node (e.g., the Class A node 170E) associated with the user (recipient) account 215 does not communicate with either the virtual currency issuing authority 130 or a centralized transaction clearance authority (because the system 100 does not include one). Instead, transaction clearance is decentralized and performed entirely by a subset of the distributed nodes 170. Further, transaction receipts are not broadcast to the entire network 172. After the transaction is validated and the transaction receipt is stored within a portion of the network 172, the transaction is irreversible (like a conventional cash transaction).

Figure 5:
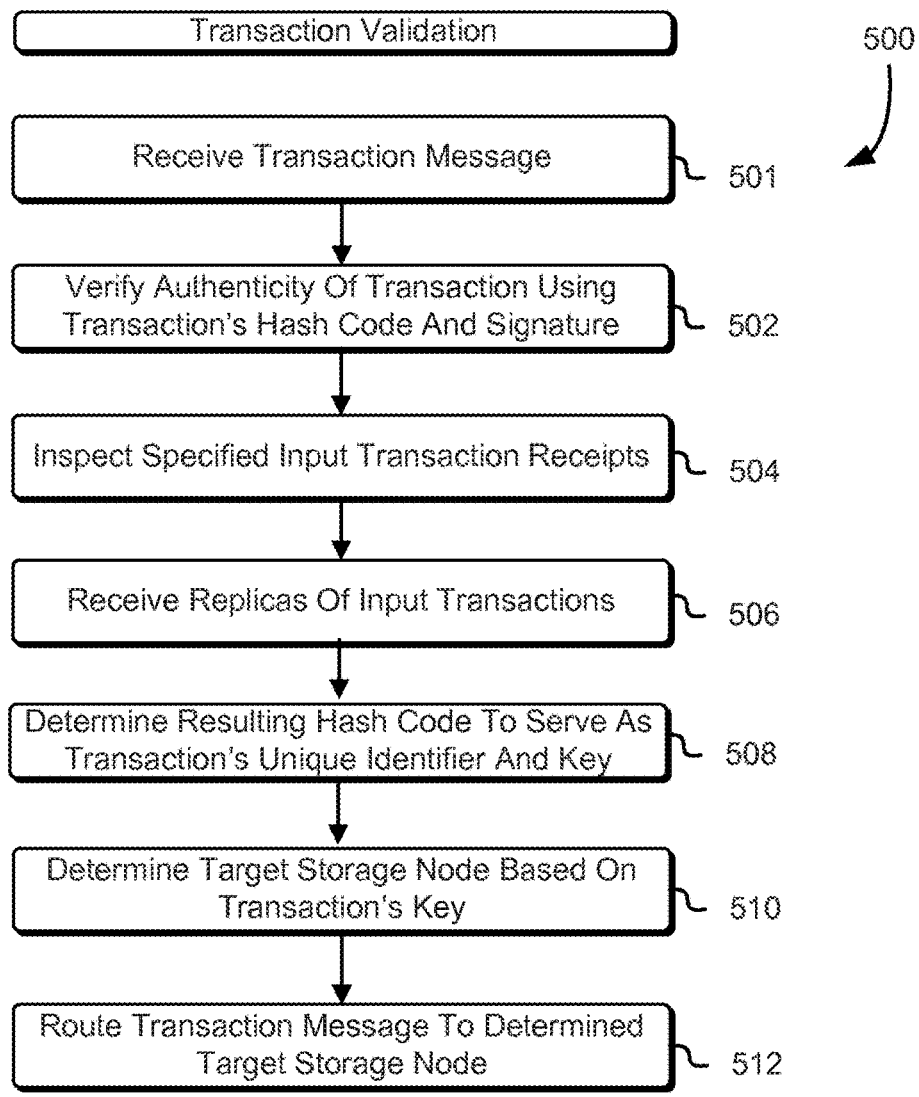
FIG. 5 is an illustrative example of a method of validating the transaction.

FIG. 5 is a flow diagram of an embodiment of a method 500 of validating the transaction message 208 that may be performed by the regular nodes 170A-170G. For ease of illustration, the method 500 will be described as being performed by the Class A node 170E. In first block 501, the recipient node (e.g., the Class A node 170E) receives the transaction message 208. In block 502, upon receipt of the transaction message 208, a recipient node verifies the authenticity of the transaction by verifying the transaction's hash code and the signature. In block 504, the recipient node inspects the transaction receipts referred to (or included in) the transaction message 208 and queries the network R1 for copies of them. For each input transaction receipt included in the transaction message 208, the same verification of the transaction hash and signature is applied. In block 506, the network R1 sends the requested copies of the input transaction receipts, and the recipient node compares them with each other to ensure consistency of the data.

In block 508, the recipient node (e.g., the Class A node 170E) hashes the transaction message 208 to obtain a hash value to use as a unique identifier for the transaction and as key for storage purposes. In block 510, a target storage node is identified based on the transaction's key. Finally, in block 512, a transaction receipt 210 is generated and routed to the determined target node (e.g., the node 170G).

3. Recordation

As mentioned above, a transaction receipt (e.g., the transaction receipt 210) is generated for each completed transaction. The transaction receipt 210 is the record evidencing a validated transaction. Each node stores transaction receipts received from other nodes. However, none of the nodes 170 stores transaction receipts for all of the transactions conducted within the network 172. Instead, each node stores transaction receipts for only a portion of the transactions.

Returning to FIG. 2, the transaction receipt 210 is routed to a node for storage based on a calculated hash of the transaction receipt (or a portion of the information included therein), which is used to lookup a node having a node ID computationally closest to the hash value. For ease of illustration, the node 170G will be described as having the node ID closest to the hash value. Thus, in this example, the transaction receipt 210 is routed to the node 170G. The node 170G replicates the transaction receipt 210 to create copies 212A and 212B and sends the copies to a number of other nodes for storage. The use of a hash of the transaction receipt 210 as a key for routing purposes enforces randomness of where the transaction receipt 210 is processed and stored.

Thus, the system 100 may use a transaction-centric and distributed approach to validating transactions and/or storing transaction receipts. Using the routing algorithm of the DHT 115, the transaction receipt 210 is routed to a peer (e.g., the node 170G) in the P2P network 172 based on its hash. The peer then validates and verifies the transaction and initiates its storage.

Figure 6:
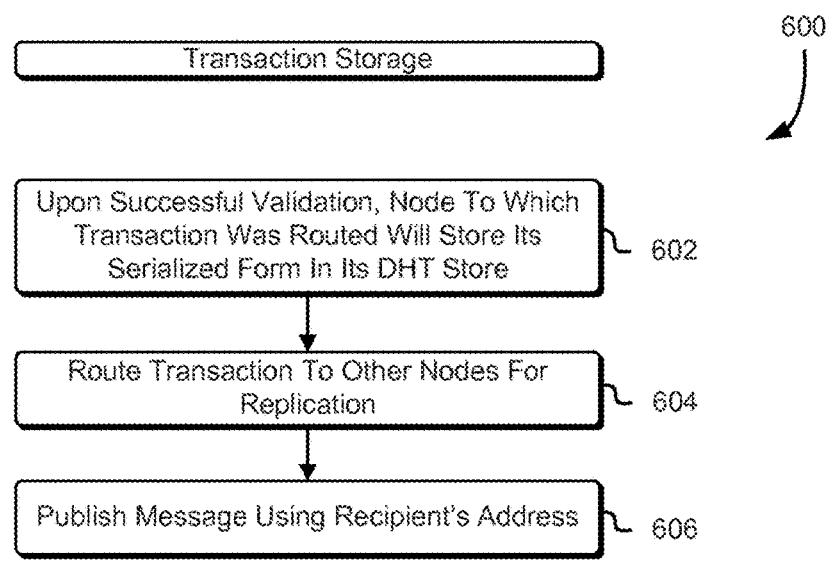
FIG. 6 is an illustrative example of a method of recording the transaction in a portion of the nodes of the network of FIG. 2.

FIG. 6 is an illustrative example of a method 600 performed by the "validation/storage" nodes (or Class A and B nodes). For ease of illustration, the method 600 will be described as being performed by the node 170G. In first block 602, when a transaction has been deemed valid (e.g., using the method 500 described above), the node (e.g., the node 170G) to which the transaction receipt 210 was routed (by the recipient node) will store a serialized form of the transaction receipt in the DHT store 116 (see FIG. 3) of the node. In block 604, the node copies the transaction receipt 210 (to create copies 212A and 212B) and routes the copies to a number of other nodes for storage thereby. In block 606, when the storage operation is complete, the node publishes a message using the recipient's address (or the public key associated with the user (recipient) account) as the topic for the subscription. The recipient node would have previously subscribed to a topic, which is the recipient's address. As such, if the target recipient is online, the recipient node will be notified of the transaction by the published message. Upon receipt of the notification, the recipient node retrieves the transaction receipt from the overlay P2P network R1 and updates its local storage 114 (see FIG. 3). If the target recipient is offline, the recipient node will learn of the transaction as part of the synchronization process (e.g., a method 800 described below). According to example embodiments, once a transaction is validated and stored within the network 172, the transaction is irreversible.

The storage mechanism (e.g., in block 604) sends the copies 212A and 212B of the transaction receipt to "x" number of peers, each of which verifies the transaction receipt before storing it. When an attempt is made to retrieve a transaction receipt for the purposes of using it as an input to a subsequent transaction message, the system 100 retrieves (e.g., in block 404 of the method 400) copies of the transaction receipt from the peers. It verifies the consistency of "y" number of the copies of the transaction receipt as a condition to considering the retrieval a success. The number of copies of the transaction receipt stored (e.g., "x" number) may directly affect the reliability and availability of the transaction receipts. The value of "y" may be considered a verification factor that relates to the integrity of the record. The use of a hash of the transaction receipt as a key for routing purposes introduces randomness as to where the transaction receipt is processed and stored.

The references to (or copies of) transaction receipts (referred to as "referenced inputs") included in the transaction message 208 are signed by the sender (using the private key 118 associated with the sender's user account 220) to prove ownership. The system 100 verifies the signatures by independently retrieving the referenced inputs and running signing scripts. The transaction receipt may be hashed by serializing the various elements of the transaction receipt and performing a hash function (for example, SHA 256, anther cryptographic hash function, combinations thereof, and the like) on the serialized elements to obtain a hash value that is used as the key for the DHT routing and storage. When a transaction receipt is used as a referenced input, it is marked as spent (or completed) by adding a forward link (to the transaction receipt) to the next more recent transaction. In this manner, the chain of transaction receipts may resemble a doubly linked list.

The software components implementing the nodes 170 may be written in a programming language, such as Java. Further, software applications implementing the nodes 170 may be built on top of a well-known DHT implementation called Pastry. The core components of Pastry, as contained in the FreePastry library, may be used to provide the mechanics used to create and maintain the overlay P2P network R1, and the routing algorithm that locates nodes within that network. In addition to the FreePastry library, components built on top of Pastry (e.g., PAST and SCRIBE) may be used. PAST is a peer-to-peer storage utility with built-in replication capabilities. SCRIBE is a group communication and event notification component. The example embodiments can further use Apache Derby as an embedded database for local storage (e.g., the local storage 114 depicted in FIG. 3). Alternative example embodiments may be written in different programming languages or using other proprietary or open-source libraries.

As mentioned above, each user account may be associated with a public-private key pair. The public key 116 (see FIG. 3) may be used as a publicly visible address of the user account. A user can request a new address (for a user account) through the user interface of the client application 110 or through a command line interface. The system may generate a key pair using elliptic curve cryptography and a Java security provider (e.g., BouncyCastle). The key-pairs are stored locally and not to the DHT 115.

Optionally, the computing system 132 may implement a registry (not shown) of easy-to-remember names (or aliases) that can optionally be used in place of the public keys. Optionally, a registration process may be used to ensure the uniqueness of an alias and to create the address association.

Genesis Transactions

As mentioned above, the mint nodes 120 create units of the virtual currency using a genesis transaction. It is different from other transactions in that a genesis transaction does not include references to (or copies of) transaction receipts of the sender. Special-purpose mint addresses may be predefined in the computing system 132. A valid genesis transaction is both addressed to one of the mint addresses and initiated by one of those addresses.

A transaction receipt may be generated by the mint node, and forwarded to one of the nodes 170 for storage in a portion of the network 172 (e.g., in accordance with the method 600).

Node Boot-Up and Synchronization

Figure 7:
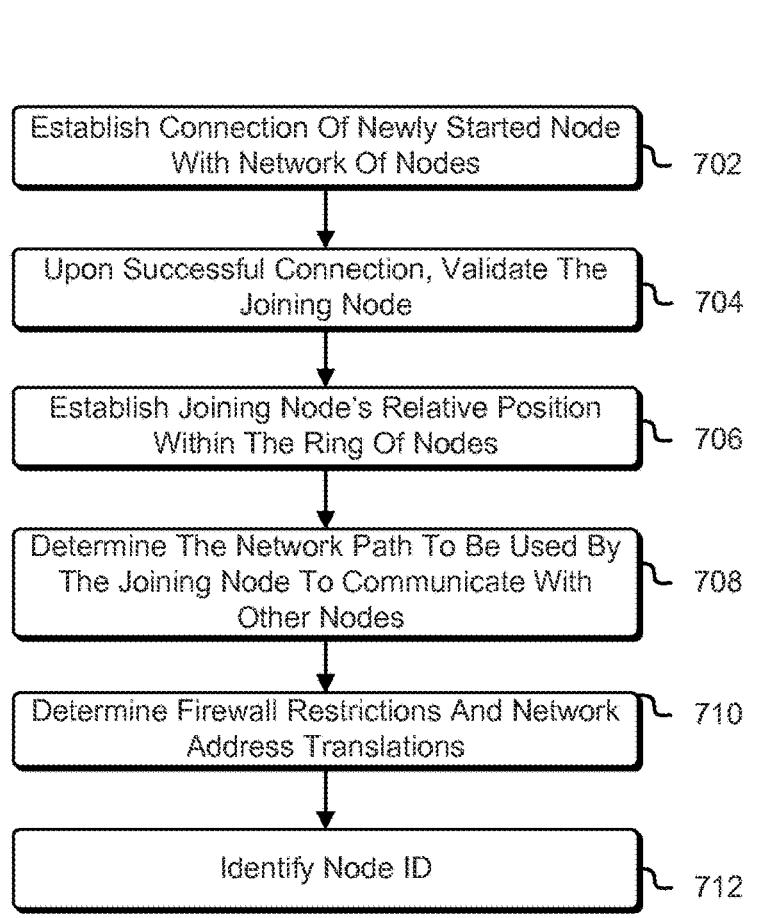
FIG. 7 is an illustrative example of a process for booting a node on the network of FIG. 2.

FIG. 7 is an illustrative example of a method 700 that may be performed by one of the nodes 170 when it boots up and connects to the P2P network 172. In first block 702, when a node is started up, the node (referred to as a "joining node") establishes a connection to the P2P network 172. This process may be referred to as a "bootstrapping" process during which the joining node attempts to establish a connection to another node (referred to as a "bootstrap node") within the P2P network 172. The bootstrap node could be any node. However, by default, the joining node may attempt to connect with a node associated with an IP address associated with a known domain name.

In block 704, once a connection to the bootstrap node is established, the joining node is validated. The node validation process ensures that the joining node is running a legitimate version of the software (e.g., the validation/storage application 109 and/or the client application 110). Thus, the node validation process helps prevent nodes that are executing code that has been tampered with (e.g., for ill purposes) from joining the network. During the node validation process, the bootstrap node supplies a randomly generated number (referred to as a "handshake ID") to the joining node. The joining node locates one or more portions of the software (e.g., several class files within the component library) and loads the portion(s) located as a byte stream. The byte stream is hashed together with the handshake ID to obtain a first hash result. The first hash result is sent to the bootstrap node. The bootstrap node compares the first hash result with a second hash result created by the bootstrap node. The bootstrap node creates the second hash result by loading one or more portions of a legitimate copy of the software as a byte stream, and hashing the byte stream together with the handshake ID. If the first and second hash results are not equal, the bootstrap node will reject the joining node. In other words, the bootstrap node does not validate the joining node. When this happens, the method 700 terminates. On the other hand, if the first and second hash results are equal, the bootstrap node validates the joining node, and the method continues at block 706.

In block 706, the joining node's relative position within the overlay P2P network R1 is established for purposes of routing and addressability. In block 707, a network path that will be used by the joining node when communicating with other nodes is determined. In block 710, firewall restrictions and network address translations are determined. In some example embodiments, depending on the firewall restrictions, a proxy node may be used. Finally, in block 712, the joining node is identified using a node ID. For a node that is joining for the first time, its node ID may be generated by applying a hashing algorithm on its external IP address and network path. As mentioned above, this node ID essentially serves as a key in the DHT 115 (see FIG. 3).

As mentioned above, each of the "validation/storage" nodes (or Class A and B nodes) establishes a location within its disk space upon which it will be storing transaction receipts (and copies thereof) that are routed to the node 170E by the overlay P2P network R1. This is referred to as its DHT store (e.g., the DHT store 116 depicted in FIG. 3).

Each of the nodes 170 establishes a location within its disk space that it will use for storing references to transactions that are relevant to its accounts. This is called its local storage (e.g., the local storage 114 depicted in FIG. 3). The local storage is used primarily for determining the balance and history for the node's accounts without having to query the network for all its transactions.

Figure 8:
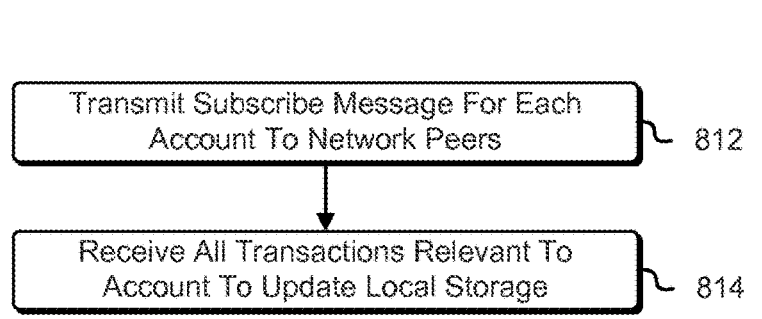
FIG. 8 is an illustrative example of a process for synchronizing local storage on a node with distributed storage on the network of FIG. 2.

A local storage can get out-of-synch when transactions relevant to the node's accounts occur while the node is offline. FIG. 8 is an illustrative example of a method 800 performed by each of the nodes 170 after it boots up (e.g., after the method 700 is performed). The method 800 performs a synchronization process when the node is booted up. In first block 812, the node sends, to the overlay P2P network R1, a subscribe message for each of its accounts using the addresses (public keys) as topics. This informs the overlay P2P network R1 that the requesting node wants to receive notifications for any transaction that is relevant to its accounts. In response to the subscribe message, the other nodes in the network send, to the requesting node, copies of all transaction receipts that are relevant to the user accounts associated with the requesting node. In block 814, the requesting node uses these to update its local storage.

Virtual currencies and digital bearer instruments (such as those implemented by the system 100) may open new demographic markets, enable access to formerly inaccessible geographies, and/or reduce cost-per-transaction for online payments. In particular, virtual currencies and digital bearer instruments (such as those implemented by the system 100) may eliminate entire classes of costs (such as those imposed by intermediaries) related to transaction processing and online fraud.

The costs and risks associated with an intermediated system when transacting online are at best costly and at worst potentially crippling. The system 100 provides a mechanism by which the merchants 160 may transact with the customers 150 with the same or similar certainty enjoyed by real-world (brick and mortar) merchants when accepting cash. In other words, the system 100 may be used to replicate face-to-face cash transactions in an on-line environment, and conduct irreversible online transactions without engaging a financial intermediary. Stated differently, the virtual currency implemented by the system 100 may be characterized as being digital bearer instrument (or true "digital cash") analogous to real world cash that enables payments over a communications channel, such as the Internet, without involving a trusted party (e.g., a bank). In short, from a merchant perspective, being able to create a digital bearer instrument that is not dependent on existing financial intermediaries and that is irreversible, completely eliminates transaction costs, sidesteps tremendous fraud and associated cost exposure, and opens up the ability to enter new markets, address new demographics, and offer new classes of products and services online.

Because the system 100 may be used to conduct online transactions that have the four attributes of a face-to-face cash transaction, transaction-processing fees may be reduced or eliminated completely. Further, the system 100 avoids losing hundreds of billions of dollars annually to fraud and fraud mitigation/investigation costs. The system 100 may be used to implement truly virtual cash having a stable price and effectively unlimited liquidity that may be used to conduct non-intermediated and irreversible transactions over the Internet.

Example embodiments provide for an electronic or digital bearer instrument system based on cryptographic proof instead of trust, allowing any two willing parties to transact directly and irreversibly with each other without the need for a trusted third party intermediary.

Example embodiments of the system 100 resolve the double spend problem (described below) while simultaneously preserving the direct transmissibility and anonymity of transactions conducted using the virtual currency.

The system 100 may be used to implement one or more secondary exchanges, because the system 100 enables direct transmission of units of the virtual currency between users. Due to regulatory or risk-mitigation strategies, it is anticipated that the mint system may restrict the sale of the virtual currency to within specified jurisdictions. Therefore, it is anticipated that secondary exchanges may arise between users to allow for the transmission into the restricted regions, though the system 100 may not generally participate in such exchanges.

The system 100 enables the direct transmission of the virtual currency cleared through the decentralized P2P network 172. This helps eliminate transaction processing fees, allows for merchant risk autonomy, and provides for transaction velocity. For example, without the required participation of an intermediary to process and clear transactions, there are no transaction fees imposed for such intermediation. Additionally, the absence of third party intermediaries allows the parties to transact on whatever basis they are comfortable engaging, whether in relation to the types of goods or services on offer, or the degree to which the recipient wishes to collect KYC information from the sender. This is in stark contrast to the intermediated models, wherein the third party defines what sorts of transactions are acceptable and at what levels, what data is to be collected and submitted and what fees or costs will be levied and imposed. While credit card clearance times are very fast, many other incumbent bank-to-bank systems can take up to several days before clearing. Direct transmission of a digital instrument between customer and merchant may be extremely fast (from hundredths of a second to a few minutes).

According to example embodiments of the system 100, virtual currency transactions cleared through the distributed network 172 are irreversible. Enabling irreversible transactions for ecommerce has at least three distinct benefits to merchants: (1) elimination of fraud costs, (2) enablement of new offerings and markets, and (3) enhanced customer experiences. For example, as with cash transaction, functional irreversibility alleviates entire categories of risk and fraud exposure. Furthermore, by eliminating the risk of payment reversal, merchants can make new services or products available online. Rapid, irreversible service transactions, for example, that would be difficult to justify under threat of payment reversal would become viable. Moreover, jurisdictions or demographics that are historically categorized as high-risk from a fraud perspective may be accessed without incremental exposure. Merchants may choose to transact with customers with a less onerous KYC burden, thereby both reducing their own operational costs and streamlining and improving the customer experience and conversion rates.

Some KYC requirements are imposed by virtue of the merchant's products or industry, or due to other regulatory requirements. Therefore, in some embodiments, the system 100 implements additional diligence and compliance required to ensure that a particular payment instrument is not being fraudulently used, and gathers sufficient verifiable personal information regarding the customer to enable the merchant to initiate proceedings against the customer in the event of default or otherwise.

Example embodiments of the system 100 are designed to enable the creation of virtual currencies that are pegged to fiat currencies at a fixed rate. Unlike Bitcoins or AMAZON® Coins or other virtual currency systems; however, the example embodiments presented herein include a virtual currency infrastructure, which enable the creation of multiple virtual currencies cleared through the same distributed network infrastructure. In other words, the instant example embodiments can be used to introduce a virtual currency, used in accordance with example embodiments, pegged to the Swiss Franc, and another instance of the virtual currency indexed to the Euro or the US Dollar. Similarly, it allows the creation of a virtual currency that could be pegged to fiat currency basket (e.g., a portfolio of several fiat currencies with different weightings).

While inter-user transmission is anonymous and cleared through the network 172 (i.e., without the interposition of a centralized authority), an authority (such as the issuing authority 130) may, at times, operate the digital mint (implemented by the mint nodes 120). The mint may always issue virtual currency at a pegged rate, and redeem such currency at the then-current pegged rate. As such, because the reserves are to be held in the currency of purchase, an effectively unlimited amount of virtual currency can be purchased or redeemed at any time and, because the virtual currencies according to example embodiments presented herein are pegged, such transactions, regardless of scale, will themselves have no impact on the currency price.

With regard to portability, one can consider the evolution of the means of currency storage as one from physical possession of cash (the physical 'wallet'), to online intermediated access products (the "e-wallet") to mobile-enabled intermediated products (the "m-wallet" or "phone-as-wallet") to the user account 108 (see FIG. 3), which may be characterized as being an electronic wallet. Wealth can be effectively stored anonymously within the decentralized, dynamic, global network 172. The electronic wallet (i.e., the user account 108) can be manipulated from anywhere on Earth, which allows users to have the ability to manage their virtual holdings and to send or receive virtual currency from anywhere on the planet.

Example embodiments of the system 100 enable users to operate with the assurance that the private key to unlock, access, and transfer their wealth resides solely in their brains. Multiple addresses can be created instantaneously. This provides users with financial privacy and asset protection combined with the ability to have those assets fully usable from anywhere in the world (assuming there is Internet connectivity). Such assets are (systemically) protected from theft or confiscation unless a user can be legally compelled to reveal his or her private key (which may or may not be known to exist). For example, a user may reveal the secret key to a loved one for inheritance reasons or even splitting the phrase into segments with each family member possessing a portion of the total phrase. Off-grid transactions are also possible by simply conveying the phrase via voice or encrypted email.

Terminology

The terminology used to refer to payment technologies, business models and transaction infrastructure is often inconsistently and/or interchangeably used. Examples of such terminology includes, for example, "electronic money," "digital cash," "Internet money," "crypto currency," "e-Money," "iCash," "digital purses," "ewallets," and "virtual currency."

For purposes of describing and illustrating example embodiments of the system 100, the following four terms will be defined in additional detail: (1) Money, (2) Digital Money, (3) Virtual Currency, and (4) E-Money.

Money:

The so-called "textbook triad" functions of money are as follows: (1) To Provide a Medium of Exchange, (2) To Store Value, and (3) To Provide a Unit of Account. Money provides a medium of exchange used in trade to avoid the inconveniences of a pure barter system. The classic view is that to serve as a measure of value (or a medium of exchange), be it for a good or service, money needs to have constant inherent value of its own or it must be firmly linked to a definite basket of goods and services. In other words, money should have constant intrinsic value and stable purchasing power. Money can be used to store value, whereby money can be saved and retrieved for future use. Money can be a unit of account, providing a standard monetary unit of measurement of the value/cost of goods, services, and/or assets.

Digital Money:

"Digital Money" is denominated value stored in electronic form, issued or can be generated by private actors (i.e., non-governmental entities), and may be exchanged for goods and/or services. It is noteworthy that Digital Money products differ from so-called "access products" that allow consumers to use electronic means of communication to access otherwise conventional payment services (for example, use of the Internet to make a credit card payment or for general "online banking").

Virtual Currency:

"Virtual Currency" is a type of Digital Money that is denominated in a proprietary unit of account other than a representation of a "real" currency (e.g., points, tokens, credits, "coins," etc.) and which is usually adopted and accepted among members of a particular virtual community. Examples of virtual currencies include FACEBOOK® Credits, Bitcoins, Linden Dollars, and AMAZON® Coins.

E-Money:

Unlike Digital Money and Virtual Currency, "E-money" has a defined and meaningful legal definition because e-money systems are regulated forms of financial instruments. This has a number of consequences, both positive and negative, as will be discussed further below.

To begin, reference is made to the European "E-Money Directive", a directive passed by the European Commission and implemented (albeit not with perfect consistency) within the member states of the European Union. While from a legal perspective the E-Money Directive is only meaningful within the European Union, it is an important and useful reference point.

The Directive defines e-money as follows: "eMoney" is monetary value that is: (a) represented by a claim on the issuer, (b) stored electronically, (c) ensures the credibility of the transaction without a central processing authority accepted as a means of payment by undertakings other than the issuer, and (d) issued on receipt of funds of an amount not less in value than the monetary value issued. In effect, e-money always derives from traditional "real" currency. Tokens of value issued by barter-clubs, private exchange-rings or other payment systems in exchange for real economic goods or services and virtual currencies (like for example Bitcoins) that are issued in computer networks without any service in return, are exempt from the definition of e-money, even though they fulfill the same economic function as e-money and have the actual potential of privately issued currencies.

The definition does not concern itself with the specifics of technology, that is, the law does not concern itself with how such value is conveyed between the sender and the recipient, or whether the transactions are 'anonymous' or not. If the technology or system manifests these four characteristics, it qualifies as e-money and is subject to licensing and regulation. If it does not constitute e-money according to this definition, it does not.

As will be immediately apparent, this legal definition of e-money will exclude many products traditionally referred to as such. For example, Bitcoins are not e-money because they are not issued on receipt of funds (they are generated by "miners" following the expenditure of CPU "effort") and they do not represent a claim on the issuer (as there is no issuer). Loyalty programs, airline points, etc. are not e-money because they are not accepted outside of a closed-loop system and, in many cases, are not purchased but rather earned and "awarded" by other means (frequent flyer status, for example). AMAZON® Coins would not constitute e-money because they are not accepted as payment by anyone other than AMAZON®.

Given the foregoing working definitions, it is clear that while E-money and Virtual Currencies are both forms of Digital Money, they are neither synonymous nor mutually exclusive terms. The above-noted definitions are useful to clarify the distinctions between the products and, more importantly, help predict the legal status of these schemas. However, understanding these general categories provides only the most superficial understanding of these schemes and how they function.

The following sections provide definitions and explanations related to selected terminology.

Open Systems vs. Closed Systems

A "closed" digital money system is one in which the money can only be used within a contained system, which is typically managed by the issuer. Examples of closed virtual money schemes include FACEBOOK® Credits, NINTENDO® Points, AMAZON® Coins, and airline frequent flyer programs (where points can only be used to purchase flights or rewards from the issuing airlines).

In contrast, "open" digital money schemes allow the money to be spent outside of a closed system. Examples of open virtual money schemes are Bitcoin and, to some degree, Linden Dollars, where these "currencies" can be used to purchase goods or services from any merchant or transact with any individual that elects to accept them as payment.

Bidirectional vs. Unidirectional

"Bidirectional" systems allow users to buy and sell virtual currency according to exchange rates between real world (or fiat) currencies and the virtual currency. Bidirectional systems allow virtual currencies to operate in a manner similar to that of any other convertible currency with regard to their interoperability with the 'real world.'

"Unidirectional" systems allow the virtual currency to be purchased directly using real world currency at a specific exchange rate, but the virtual currency cannot be redeemed for the original or any other fiat currency (i.e., the purchase is one-way).

Direct vs. Intermediated Transmission

"Direct transmission" means that a transaction can be conducted without the need to interact with a bank or some other form of central clearing authority (sometimes referred to as "permission-free transactions"). Direct transmission systems operate online or offline.

"Intermediated Transmission" means that a transaction requires clearance through a bank or other centralized authority.

Clearance

"Clearance" refers to the process by which a transaction is validated and effected. This process can be further broken down into steps. In a transaction wherein a sender initiates transfer of value to a receiver, such steps may include, for example: (1) Validating that the sender is who they purport to be (identify validation); (2) Verifying the sender has sufficient balance/possession of value (balance confirmation); (3) Confirming the receiver is a valid recipient; (4) Confirming the receiver accepted the transfer (if required);

and (5) Completing the transfer, which may include debiting the sender, crediting the receiver, and updating records.

Double Spending

A fundamental challenge for digital money schemes is what is known as the "double spend" conundrum, which asks what precludes an actor from sending digital money to one recipient and then subsequently sending it to someone else?

Since a virtual currency is simply a series of bits, a "piece" of e-money is hypothetically very easy to duplicate. As the copy is indistinguishable from the original, counterfeiting may be impossible to detect.

However, viable digital money schemes must be able to prevent or detect double spending. There are two principal ways that this is done, as follows: (1) centralized clearance performed by a trusted centralized authority and (2) distributed clearance performed by a decentralized authority.

Centralized vs. Distributed Clearance

The first and by far the most common means of solving the double-spend problem is well understood by all who participate in the traditional financial system: centralized clearance performed by a centralized trusted authority. In such systems, the double-spend problem is avoided entirely because the trusted authority (typically a bank) is aware of all transactions, is the keeper of the master record as to ownership, effects and logs all transactions, and, in the event of a dispute, is able to determine which transaction was validly submitted and processed first. In such a system, if a previous transaction was validated and completed successfully, the second transaction will simply be recognized as invalid and fail.

The trusted authority (typically a bank) maintains a database of all user balances and transactions and can readily determine if a given piece of e-money is still "spendable." If the database indicates that the e-money has already been spent, the transaction is simply rejected. This is precisely what is meant by "Intermediated Transmission" above—a trusted intermediary intercedes within the transaction to confirm its validity and process the transaction.

The second method by which the double-spending problem can be addressed in digital money systems is by using what is known as distributed (or decentralized) clearance. While trusted centralized authority systems prevent double-spending by having a master authoritative source that follows business rules authorizing each transaction, a decentralized clearance system eliminates the central authority altogether. Instead of using centralized authorization, a state of consensus within an "aware" peer-to-peer (P2P) network topology is used.

The peer-to-peer (P2P) network itself is dynamically 'aware' of all transactions. Thus, there is no need for a centralized authority because every node maintains what the network collectively "agrees" is the definitive transactional record.

To accomplish this, transactions are publicly announced (broadcast) to the network, and a system is needed for the network to "agree" on the order in which transactions were received (so attempts to double-spend can be rejected). Every processing and storage node on the network is aware of every transaction ever made. Because the entire network is aware of any transactions, invalid transactions (attempts to double spend) will be precluded because the network will have already logged a receipt for such currency from the purported sender to another recipient.

Pegged vs. Floating

"Pegged" means that the value of the digital money is directly pegged to some extrinsic value or feature (i.e., other than supply and demand). In most instances, the peg is to an extant fiat currency. FACEBOOK® Credits, for example, could be purchased at a pegged rate of 10:1 to the U.S. dollar. Of course, a 'peg' is nothing more or less than a fixed exchange rate that is indexed against another currency or, in some instances, a 'basket' of currencies.

In contrast, "floating" virtual currency and e-money schemes employ a floating exchange rate and the value of the currency is determined solely by supply and demand. Bitcoin and Linden Dollars, for example, are not pegged to a fiat currency, but rather are traded on third party exchanges.

Irreversible vs. Reversible

An irreversible (sometimes called "hard") form of virtual money is one that does not have any mechanism to dispute or reverse transfers or payments. In other words, it only supports non-reversible transactions. In such systems, reversing transactions (even in case of a legitimate error, unauthorized use, or failure of a vendor to supply goods) is difficult, if not impossible. Examples of such systems include WESTERN UNION®, Ucash and Bitcoin.

A reversible (or "soft") form of virtual money is one whose infrastructure allows for reversal of payments, for example in case of fraud or disputes. A "hard" currency can be effectively "softened" by using a trusted third party or an escrow service.

Anonymous vs. Identified

Identified virtual money contains information revealing the identity of the person in possession or control of the funds. As is self-evident, all known intermediated systems and systems with centralized clearance functions necessarily maintain a single record and transaction log and funds can be traced through each transaction and transfer.

In contrast, anonymous virtual money functions as cash. Once anonymous virtual money is withdrawn from an account, or received from a sender, it can be spent or transferred onwards without leaving a transaction trail that contains information that would enable identification of previous senders or recipients of the anonymous virtual money.

Price Stability and Predictability

Price stability refers to the stability of the value of the instrument, particularly in relation to a beneficiary merchant's operating currency or currencies. If a merchant's cost base is denominated in Australian Dollars, for example, accepting an instrument other than one denominated in Australian Dollars and whose value is unpredictable and/or fluctuates wildly against the fiat currency in which the merchant operates introduces significant risk.

Of course, with fiat currencies price stability/predictability is a virtual given. At a minimum, inter-fiat-currency exchange fluctuations at a macro level are largely predictable and generally manageable.

However, for some emergent payment models that are unpegged—certain classes of virtual currencies in particular—price stability represents an enormous problem.

There are three means by which virtual currency pricing can be established. In increasing order of risk to the merchant, they are as follows:

1. No Risk—Operational and Pegged Virtual Currency Alignment: Virtual Currency (or e-money) denominated in merchant's operating fiat currency. Assuming adequate liquidity, if a virtual currency is denominated in or pegged at some fixed multiple to the merchant's principle operating currency, no incremental risk is introduced. For example, a US-based application developer (within the FACEBOOK® ecosystem) that wished to accept FACEBOOK® Credits for purchase of or within their application would have no currency exposure, as FACEBOOK® Credits were pegged at 10:1 against the US Dollar.

2. Manageable Risk—Operational and Pegged Virtual Currency Misalignment: Virtual currency (or e-money) denominated in or pegged at a fixed multiple to a fiat currency other than the merchant's operating currency. In this scenario, the exchange risk is knowable and is the equivalent to the merchant accepting transactions directly in the pegged fiat currency.

3. High Risk—Virtual Currency Unpegged: Virtual currency (or e-money) the price for which is determined by market forces (e.g., Bitcoin or Linden Dollars). Many virtual currency models derive their value as a function of supply and demand, expressed by the market through a variety of online exchanges and marketplaces. This results in wildly fluctuating prices, which is further exacerbated by limited market liquidity when large orders can themselves move the market. Sizable merchants will have limited incentive adopt virtual currencies as a payment method if it cannot predict and manage how the price of such currencies will move in relation to its operating currency/currencies.

As a result, a merchant accepting a virtual currency as a payment method imports an additional risk that is not present with incumbent payment methods denominated in a merchant's operating currency. If the virtual currency does not have a predictable value and exchange rate versus the merchant's principal operating currencies, then this introduces unknown and potentially unpredictable exchange risk.

It is noteworthy that within open virtual currency systems that rely on market forces to establish pricing through exchanges, the volatility problem is exacerbated by the psychographics of early adopters. While a speculator may find such wild fluctuations of interest, a merchant faced with the decision as to whether to integrate Bitcoins on a large scale, as a payment method would not.

Effectively Unlimited Liquidity

If a merchant is to accept a system that is outside of the fiat currency model, it must be assured that there is sufficient liquidity (and efficiency) within the system to allow it to manage operations. For the foreseeable future, merchants will continue to incur personnel, inventory and general operating costs in fiat currency (or currencies), and as such merchants must have certainty that it can purchase or sell large orders of such virtual currencies either to or from a centralized issuer or within the virtual currency exchanges. A merchant must be able to purchase virtual currency and exchange its virtual currency for fiat operating currencies quickly and predictably, or risk exposing itself to long-term and inter-currency fluctuations.

In order for a merchant of any scale to be willing to adopt a virtual instrument as a significant payment or refund channel, it needs to be certain that the market to acquire or dispose of such instruments is sufficiently liquid. Liquidity is of particular concern within the context of virtual currency systems whose price is determined strictly by supply and demand and whose liquidity is limited. In such cases, merchants of any scale have naturally balked at adoption, for they have no certainty—particularly for larger purchase or redemption transactions—that there will be sufficient liquidity to fulfill their orders or, if there is, whether the orders can be filled at a predictable price. Indeed, large enough transactions could have the effect of single-handedly moving the market, rendering such a system at best fraught with risk and at worst valueless.

Computing Device

Figure 9:
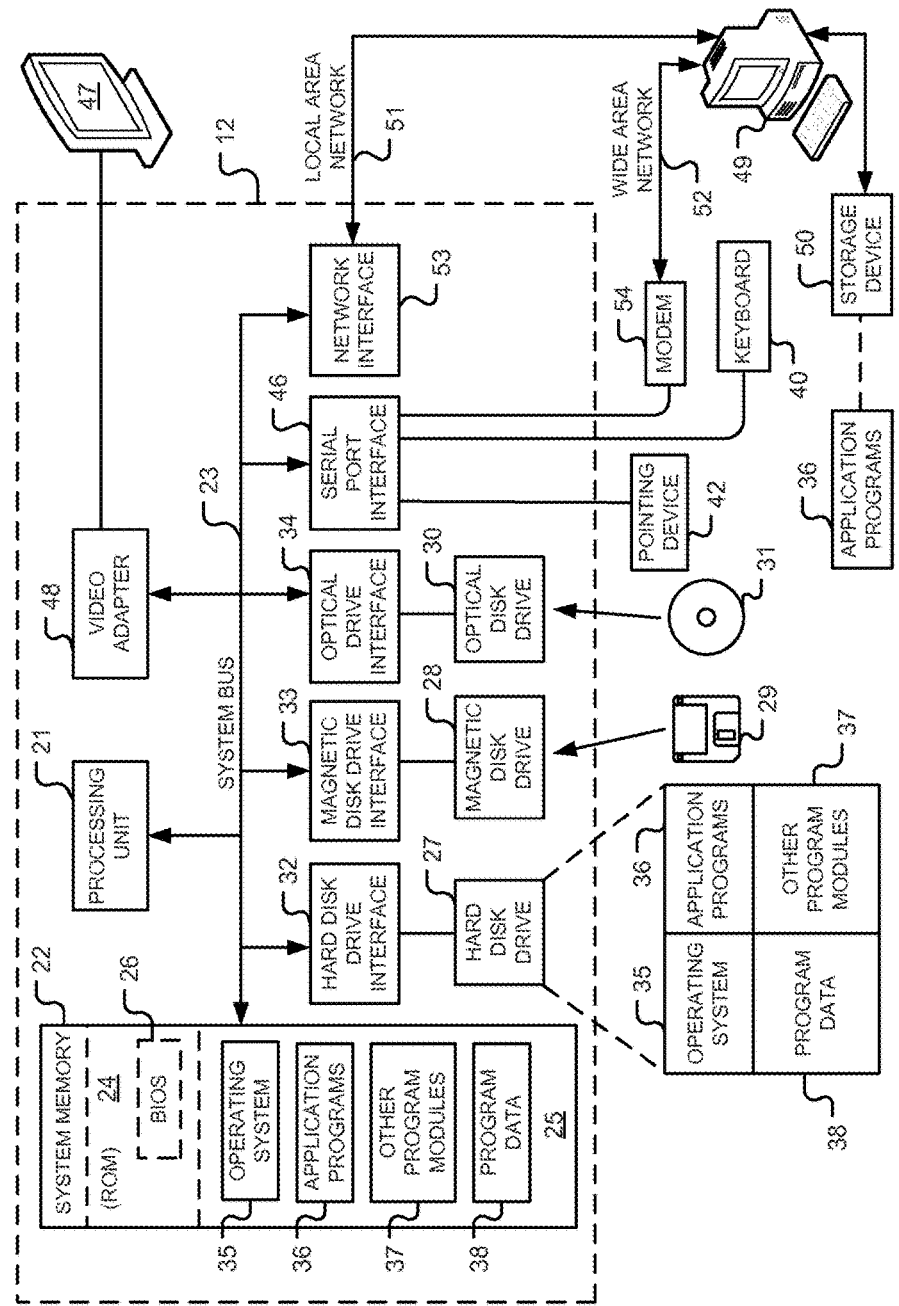
FIG. 9 is a diagram of a hardware environment and an operating environment in which the computing devices of the system of FIG. 1 may be implemented.

FIG. 9 is a diagram of hardware and an operating environment in conjunction with which implementations of the one or more computing devices of the system 100 may be practiced. The description of FIG. 9 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 9 includes a general-purpose computing device in the form of the computing device 12. Each of the computing devices 140A-140E of the system 100 of FIG. 1 and the computing devices implementing the computing system 132 may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 9 include a local-area network (LAN) 51 and a wide-area network (WAN) 52. Such networking environments are commonplace in offices, enterprise-wide computer networks, intranets and the Internet. The network 180 (see FIG. 1) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the methods 400-800 illustrated in FIGS. 4-8, respectively) described above. Such instructions may be stored on one or more non-transitory computer-readable media.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

The invention claimed is:

1. A system comprising:
a peer-to-peer network having a ring topology and comprising a plurality of computing devices, the plurality of computing devices implementing a plurality of nodes, at least a portion of the plurality of nodes implementing user accounts that each store units of a virtual currency, each of at least a portion of the nodes being configured to initiate a transaction as a sender node with a different recipient one of the plurality of nodes, the transaction transferring at least one unit of the virtual currency from a sender one of the user accounts to a recipient one of the user accounts, the recipient node being configured to validate the transaction, create a new transaction receipt after validating the transaction, perform an operation on the new transaction receipt to identify a different storage one of the plurality of nodes, and route the new transaction receipt to the storage node, the storage node being configured to store the new transaction receipt, identify next storage ones of the plurality of nodes, and route copies of the new transaction receipt to the next storage nodes for storage thereby, the new transaction receipt being stored on fewer that all of the plurality of computing devices in the peer-to-peer network and establishing within the peer-to-peer network that the transaction occurred; and
at least one mint computing device connected to the peer-to-peer network, the at least one mint computing device implementing a virtual currency mint configured to create and issue units of the virtual currency to the user accounts implemented by the plurality of nodes, the user accounts being configured to receive and store units of the virtual currency issued by the virtual currency mint, the plurality of nodes being incapable of creating units of the virtual currency.

2. The system of claim 1, wherein the sender node is implemented by a first of the plurality of computing devices, the recipient node is implemented by a second of the plurality of computing devices, and the storage node is implemented by a third of the plurality of computing devices, the first, second, and third computing devices being different from one another.

3. The system of claim 2, wherein each of the next storage nodes is implemented by a different one of the plurality of computing devices directly connected to the third computing device in the peer-to-peer network.

4. The system of claim 1, wherein each of the plurality of computing devices stores a local copy of a distributed hash table,
the sender node is implemented by a sender one of the plurality of computing devices,
the recipient account is associated with an account identifier, and
the sender node is configured to lookup the account identifier in the local copy of the distributed hash table stored on the sender computing device to obtain a recipient address, wherein initiating the transaction comprises sending a transaction request to the recipient address.

5. The system of claim 1, wherein the sender node is configured to obtain a copy of the new transaction receipt, and store the copy in a local storage accessible to the sender node.

6. The system of claim 1, wherein the sender node comprises a local storage storing a plurality of transaction receipts associated with the sender account, and initiating the transaction comprises:
obtaining copies of the transaction receipts associated with the sender account and stored in the local storage;
creating a transaction request comprising the copies of the transaction receipts; and
sending the transaction request to the recipient node.

7. The system of claim 6, wherein the transaction receipts associated with the sender account and stored in the local storage implement a doubly linked list.

8. The system of claim 6, wherein the copies of the transaction receipts in the transaction request are first copies of the transaction receipts, and the recipient node is configured to:
send requests to at least a portion of the plurality of nodes for copies of any transaction receipts associated with the sender account,
receive as second copies of the transaction receipts, transaction receipts associated with the sender account from each of only a subset of the plurality of nodes, and
validate the transaction based on the first and second copies of the transaction receipts.

9. The system of claim 6, wherein the sender node is configured to obtain a copy of the new transaction receipt, and store the copy of the new transaction receipt in the local storage.

10. The system of claim 1, wherein the recipient node is configured to:
validate the transaction without involving a validation authority,
obtain validation information from only a subset of the plurality of nodes, and
validate the transaction based on the validation information.

11. The system of claim 10, wherein the validation information comprises copies of a plurality of transaction receipts associated with the sender account.

12. The system of claim 1, wherein each of the plurality of computing devices stores a local copy of a distributed hash table,
the recipient node is implemented by a recipient one of the plurality of computing devices, and
the operation performed on the new transaction receipt by the recipient node comprises:
performing a hash function on at least a portion of the new transaction receipt to obtain a hash value; and
looking up the hash value in the distributed hash table stored on the recipient computing device to obtain an address associated with the storage node, wherein routing the new transaction receipt to the storage node comprises routing the new transaction receipt to the address associated with the storage node.

13. The system of claim 1, wherein the virtual currency mint creates and issues units of the virtual currency to the user accounts in exchange for units of a real world currency.

14. The system of claim 1, wherein the virtual currency mint is configured to receive units of the virtual currency from the user accounts, and exchange those received units for units of a real world currency.

\* \* \* \* \*

UNITED STATES PATENT AND TRADEMARK OFFICE
CERTIFICATE OF CORRECTION

PATENT NO. : 10,055,720 B2  
APPLICATION NO. : 15/783761  
DATED : August 21, 2018  
INVENTOR(S) : Robert Scott MacGregor et al.

Page 1 of 1

It is certified that error appears in the above-identified patent and that said Letters Patent is hereby corrected as shown below:

On the Title Page

Item (73) should be corrected to read:
-- NCHAIN HOLDINGS LIMITED, St. John's (AG) --

Signed and Sealed this
Twenty-ninth Day of January, 2019

Andrei Iancu
*Director of the United States Patent and Trademark Office*